US011973606B2

(12) United States Patent
Yang et al.

(10) Patent No.: US 11,973,606 B2
(45) Date of Patent: Apr. 30, 2024

(54) PRIORITIZATION BETWEEN FEEDBACK TRANSMISSIONS AND RECEPTIONS OVER SIDELINK

(71) Applicant: QUALCOMM Incorporated, San Diego, CA (US)

(72) Inventors: Wei Yang, San Diego, CA (US); Seyedkianoush Hosseini, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 432 days.

(21) Appl. No.: 17/191,546

(22) Filed: Mar. 3, 2021

(65) Prior Publication Data
US 2022/0286243 A1    Sep. 8, 2022

(51) Int. Cl.
| | |
|---|---|
| *H04L 1/1867* | (2023.01) |
| *H04L 1/1812* | (2023.01) |
| *H04W 72/0446* | (2023.01) |
| *H04W 72/20* | (2023.01) |

(52) U.S. Cl.
CPC .......... *H04L 1/1896* (2013.01); *H04L 1/1819* (2013.01); *H04L 1/1887* (2013.01); *H04W 72/0446* (2013.01); *H04W 72/20* (2023.01)

(58) Field of Classification Search
CPC ... H04L 1/1896; H04L 1/1819; H04L 1/1887; H04L 1/1614; H04L 1/1861; H04L 1/1854; H04W 72/20; H04W 72/0446
See application file for complete search history.

(56) References Cited

U.S. PATENT DOCUMENTS

| | | | | |
|---|---|---|---|---|
| 2021/0028910 | A1* | 1/2021 | Cheng | H04L 1/1854 |
| 2022/0116157 | A1* | 4/2022 | Papasakellariou | H04L 1/1664 |
| 2022/0190971 | A1* | 6/2022 | Zhang | H04L 5/0053 |
| 2022/0224452 | A1* | 7/2022 | Huang | H04L 1/1812 |
| 2022/0279537 | A1* | 9/2022 | Freda | H04W 72/1263 |
| 2022/0286243 | A1* | 9/2022 | Yang | H04W 72/0446 |
| 2022/0345249 | A1* | 10/2022 | Yoshioka | H04L 1/1861 |

FOREIGN PATENT DOCUMENTS

| | | |
|---|---|---|
| WO | WO-2020153721 A1 | 7/2020 |
| WO | WO-2020163882 A2 | 8/2020 |

OTHER PUBLICATIONS

International Search Report and Written Opinion—PCT/US2022/011614—ISA/EPO—dated Apr. 26, 2022.

* cited by examiner

*Primary Examiner* — Benjamin H Elliott, IV
(74) *Attorney, Agent, or Firm* — Holland & Hart LLP

(57) ABSTRACT

Methods, systems, and devices for wireless communications are described. In some wireless communications systems, a first wireless device may receive one or more sidelink control information messages scheduling a first multi-bit feedback and indicating a number of priority field values associated with respective feedback bits of the first multi-bit feedback. In such cases, the priority of the first multi-bit feedback may correspond to the highest priority field value. The first wireless device may determine that a first set of resources allocated for the first multi-bit feedback at least partially overlaps with a second set of resources allocated for a second feedback having a second priority, and the first wireless device may select the first or second feedback to transmit or receive based on the determined priorities of the first multi-bit feedback or the second feedback.

30 Claims, 14 Drawing Sheets

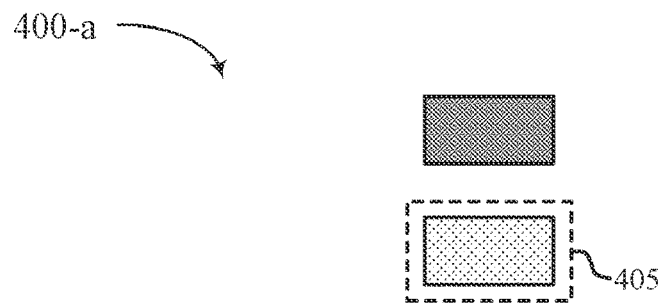
FIG. 4A
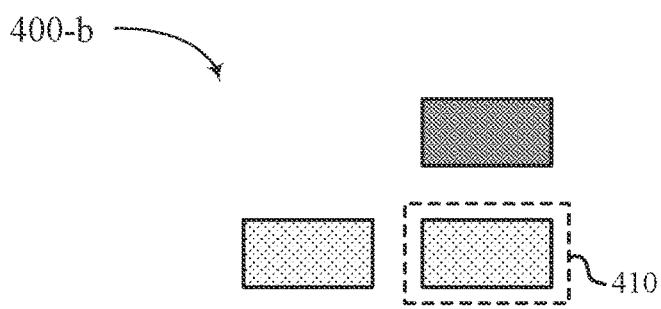
FIG. 4B
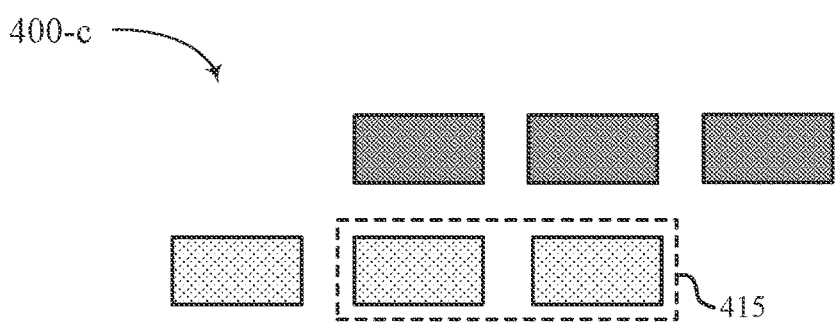
FIG. 4C
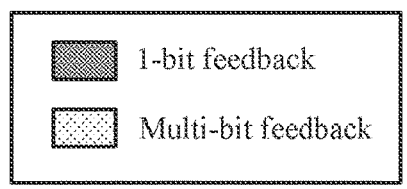

PRIORITIZATION BETWEEN FEEDBACK TRANSMISSIONS AND RECEPTIONS OVER SIDELINK

FIELD OF TECHNOLOGY

The following relates to wireless communications, including prioritization between feedback transmissions and receptions over sidelink.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may send feedback responsive to one or more sidelink transmissions using dedicated sidelink feedback resources of a sidelink feedback channel.

SUMMARY

The described techniques relate to improved methods, systems, devices, and apparatuses that support prioritization between feedback transmissions and receptions over sidelink. Generally, the described techniques may support efficient transmission and prioritization of sidelink feedback. A first wireless device may communicate with one or more additional wireless devices using sidelink communication channels. To support high reliability for sidelink transmissions, the wireless devices may transmit hybrid automatic repeat request (HARQ) feedback using a dedicated sidelink feedback channel such as a physical sidelink feedback channel (PSFCH). In some examples, the sidelink feedback channel (e.g., the PSFCH) may support feedback transmissions between sidelink wireless devices that are multi-bit feedbacks in addition to single-bit feedback.

In some cases, however, the first wireless device may identify that multiple sidelink feedback messages are scheduled to be transmitted or received concurrently (e.g., the sidelink feedback messages may overlap in time). In such cases, if the first wireless device is unable to transmit or receive both feedback messages concurrently as scheduled, the first wireless device may determine which sidelink feedback message to prioritize. In some examples, the first wireless device may receive, from a second wireless device, sidelink control information that indicates a number of priority field values associated with respective feedback bits of the first multi-bit feedback, and the first wireless device may determine the priority level of the multi-bit sidelink feedback transmission by identifying a smallest priority field value (e.g., the highest priority level) among the priority field values. The first wireless device may compare the determined priority of the multi-bit feedback to the priority of an overlapping feedback transmission (e.g., either a single-bit sidelink feedback transmission or another multi-bit feedback) to determine which sidelink feedback to prioritize receiving or transmitting.

A method for wireless communications at a first wireless device is described. The method may include receiving, from a second wireless device, one or more sidelink control information messages scheduling a first multi-bit feedback and indicating a set of multiple priority field values associated with respective feedback bits of the first multi-bit feedback, where a first priority of the first multi-bit feedback corresponds to a highest priority of the set of multiple priority field values, determining that a first set of resources allocated for the first multi-bit feedback at least partially overlaps with a second set of resources allocated for a second feedback having a second priority, selecting one of the first multi-bit feedback or the second feedback based on the first priority of the first multi-bit feedback and the second priority of the second feedback, and transmitting or receiving, the selected one of the first multi-bit feedback or the second feedback.

An apparatus for wireless communications at a first wireless device is described. The apparatus may include a processor, memory coupled with the processor, and instructions stored in the memory. The instructions may be executable by the processor to cause the apparatus to receive, from a second wireless device, one or more sidelink control information messages scheduling a first multi-bit feedback and indicating a set of multiple priority field values associated with respective feedback bits of the first multi-bit feedback, where a first priority of the first multi-bit feedback corresponds to a highest priority of the set of multiple priority field values, determine that a first set of resources allocated for the first multi-bit feedback at least partially overlaps with a second set of resources allocated for a second feedback having a second priority, select one of the first multi-bit feedback or the second feedback based on the first priority of the first multi-bit feedback and the second priority of the second feedback, and transmit or receive, the selected one of the first multi-bit feedback or the second feedback.

Another apparatus for wireless communications at a first wireless device is described. The apparatus may include means for receiving, from a second wireless device, one or more sidelink control information messages scheduling a first multi-bit feedback and indicating a set of multiple priority field values associated with respective feedback bits of the first multi-bit feedback, where a first priority of the first multi-bit feedback corresponds to a highest priority of the set of multiple priority field values, means for determining that a first set of resources allocated for the first multi-bit feedback at least partially overlaps with a second set of resources allocated for a second feedback having a second priority, means for selecting one of the first multi-bit feedback or the second feedback based on the first priority of the first multi-bit feedback and the second priority of the second feedback, and means for transmitting or receiving, the selected one of the first multi-bit feedback or the second feedback.

A non-transitory computer-readable medium storing code for wireless communications at a first wireless device is described. The code may include instructions executable by a processor to receive, from a second wireless device, one or more sidelink control information messages scheduling a first multi-bit feedback and indicating a set of multiple priority field values associated with respective feedback bits of the first multi-bit feedback, where a first priority of the first multi-bit feedback corresponds to a highest priority of the set of multiple priority field values, determine that a first set of resources allocated for the first multi-bit feedback at least partially overlaps with a second set of resources allocated for a second feedback having a second priority, select one of the first multi-bit feedback or the second feedback based on the first priority of the first multi-bit feedback and the second priority of the second feedback, and transmit or receive, the selected one of the first multi-bit feedback or the second feedback.

In some examples of the method, apparatuses, and non-transitory computer-readable medium described herein, selecting one of the first multi-bit feedback or the second feedback may include operations, features, means, or instructions for selecting the first multi-bit feedback for transmission or reception over the first set of resources based on the first priority being higher than the second priority.

In some examples of the method, apparatuses, and non-transitory computer-readable medium described herein, a first priority field value corresponding to the first priority may be smaller than a second priority field value corresponding to the second priority.

In some examples of the method, apparatuses, and non-transitory computer-readable medium described herein, selecting one of the first multi-bit feedback or the second feedback may include operations, features, means, or instructions for receiving, from the second wireless device, a priority field value associated with the second feedback, wherein the priority field value associated with the second feedback corresponds to the second priority of the second feedback In some examples of the method, apparatuses, and non-transitory computer-readable medium described herein, selecting one of the first multi-bit feedback or the second feedback may include operations, features, means, or instructions for determining that the first priority of the first multi-bit feedback may be equal to the second priority of the second feedback, comparing a number of feedback bits of the first multi-bit feedback to a number of feedback bits of the second feedback to determine which feedback has a greater number of feedback bits, and selecting the first multi-bit feedback or the second feedback for transmitting or receiving based on the comparing.

In some examples of the method, apparatuses, and non-transitory computer-readable medium described herein, selecting one of the first multi-bit feedback or the second feedback may include operations, features, means, or instructions for determining that the first multi-bit feedback may be associated with a first number of transport blocks and the second feedback may be allocated for a second number of transport blocks and selecting the first multi-bit feedback or the second feedback for transmitting or receiving based on the respective feedback transmission that may be associated with a greater number of transport blocks.

In some examples of the method, apparatuses, and non-transitory computer-readable medium described herein, selecting one of the first multi-bit feedback or the second feedback may include operations, features, means, or instructions for determining that the first priority of the first multi-bit feedback may be equal to the second priority of the second feedback, where the first multi-bit feedback includes a first set of feedback bit repetitions and selecting the first multi-bit feedback for transmitting or receiving based on the first multi-bit feedback including the first set of feedback bit repetitions.

In some examples of the method, apparatuses, and non-transitory computer-readable medium described herein, the second feedback includes a single-shot feedback transmission.

In some examples of the method, apparatuses, and non-transitory computer-readable medium described herein, selecting one of the first multi-bit feedback or the second feedback may include operations, features, means, or instructions for determining the second feedback includes a second set of feedback bit repetitions and selecting the first multi-bit feedback for transmitting or receiving based on the first multi-bit feedback occurring before the second feedback.

In some examples of the method, apparatuses, and non-transitory computer-readable medium described herein, selecting one of the first multi-bit feedback or the second feedback may include operations, features, means, or instructions for determining that the first multi-bit feedback occurs concurrently with the second feedback and selecting the first multi-bit feedback for transmitting or receiving based on the first multi-bit feedback including a greater number of feedback bits.

In some examples of the method, apparatuses, and non-transitory computer-readable medium described herein, selecting one of the first multi-bit feedback or the second feedback may include operations, features, means, or instructions for determining the second feedback includes a second set of feedback bit repetitions and selecting the first multi-bit feedback for transmitting or receiving based on the first set of feedback bit repetitions having a greater number of repetitions than the second set of feedback bit repetitions.

In some examples of the method, apparatuses, and non-transitory computer-readable medium described herein, the first multi-bit feedback and the second feedback may have an equal number of feedback bits.

Some examples of the method, apparatuses, and non-transitory computer-readable medium described herein may further include operations, features, means, or instructions for determining the second feedback includes a second set of feedback bit repetitions, where at least a portion of the first set of feedback bit repetitions may be non-overlapping with the second set of feedback bit repetitions and transmitting or receiving at least the portion of the first set of feedback bit repetitions and the second set of feedback bit repetitions that may be non-overlapping.

In some examples of the method, apparatuses, and non-transitory computer-readable medium described herein, the respective feedback bits of the first multi-bit feedback include a set of multiple hybrid automatic repeat request (HARQ) bits responsive to at least one sidelink shared channel transmission.

In some examples of the method, apparatuses, and non-transitory computer-readable medium described herein, the second priority of the second feedback corresponds to an additional highest priority of one or more priority field values associated with respective feedback bits of the second feedback.

BRIEF DESCRIPTION OF THE DRAWINGS

FIGS. 4A, 4B, and 4C illustrate examples of sidelink feedback prioritization schemes that support prioritization between feedback transmissions and receptions over sidelink in accordance with aspects of the present disclosure.

DETAILED DESCRIPTION

Figure 1:
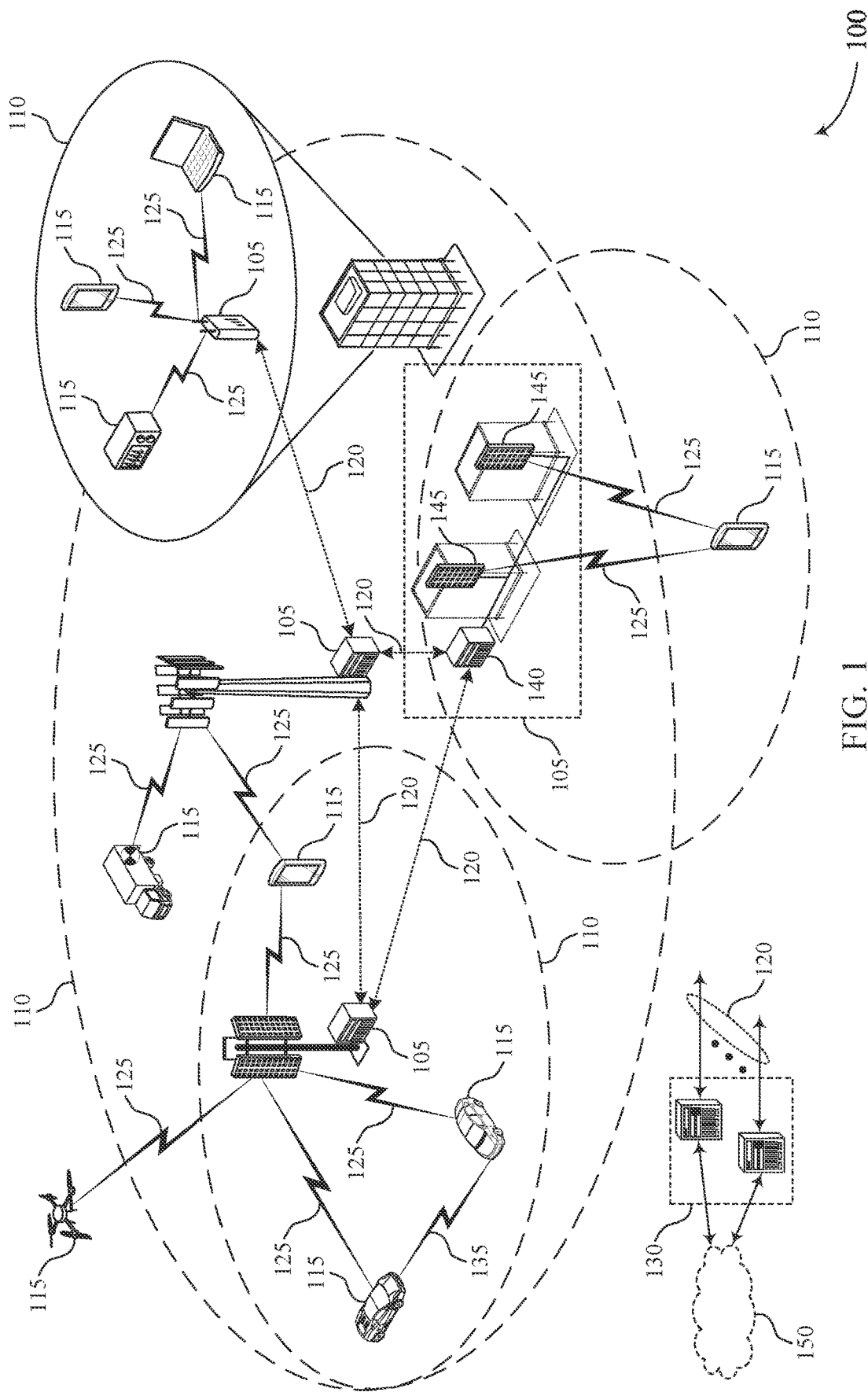
FIG. 1 illustrates an example of a wireless communications system that supports prioritization between feedback transmissions and receptions over sidelink in accordance with aspects of the present disclosure.

In some wireless communications systems, a wireless device such as a user equipment (UE) may communicate with one or more additional UEs using sidelink communication channels such as sidelink data channels, sidelink control channels, or a combination thereof. To support high reliability for sidelink transmissions, sidelink UEs may transmit hybrid automatic repeat request (HARQ) feedback using a dedicated sidelink feedback channel such as a physical sidelink feedback channel (PSFCH). In some examples, the UEs may transmit or receive a single-bit feedback transmission (e.g., a dedicated positive acknowledgement (ACK) bit or a dedicated negative acknowledgement (NACK) bit) to indicate either the successful or unsuccessful receipt of a sidelink data transmission.

In some examples, the sidelink feedback channel (e.g., the PSFCH) may support feedback transmissions between sidelink UEs that are multi-bit feedback transmissions. For example, wireless devices may utilize multi-bit feedback in cases where the device may benefit from transmitting multiple bits of feedback, for example, if a UE is configured with multiple carriers in a carrier aggregation configuration, in cases of sidelink feedback repetitions, or in cases where a sidelink UE maintains multiple communication links with a number of other sidelink UEs.

In some cases, however, a receiving sidelink UE may identify that multiple sidelink feedback messages are scheduled to be transmitted or received concurrently (e.g., the sidelink feedback may overlap in time) or the receiving sidelink UE may determine that it is to transmit or receive a number of PSFCH transmissions beyond its transmission or reception capabilities. In such cases, the receiving sidelink UE may determine which sidelink feedback message to prioritize based on a number of factors or based on a priority rule associated with multi-bit messages transmitted using the PSFCH.

In some examples, the UE may receive sidelink control information indicating a number of priority field values corresponding to feedback bits of the multi-bit sidelink feedback. The UE may determine the priority level of the multi-bit sidelink feedback transmission by identifying a smallest priority field value (e.g., the highest priority level) among the priority field values. In such examples, the UE may assign the highest priority bit of the multi-bit feedback as the overall priority of the multi-bit feedback. The UE may compare the determined priority of the multi-bit feedback to the priority of an overlapping feedback transmission (e.g., either a single bit sidelink feedback transmission or another multi-bit feedback transmission) to determine which sidelink feedback to prioritize receiving or transmitting.

In some other examples, in cases where the multi-bit sidelink feedback transmission has the same priority field value as the overlapping sidelink feedback transmission, the UE may prioritize the transmission having the greatest number of HARQ feedback bits, or the UE may prioritize the sidelink feedback transmissions based on repetitions associated with the transmissions. For example, if the multi-bit feedback transmission has repetition, and the overlapping feedback transmission is a single-shot transmission, the UE may prioritize transmitting or receiving the sidelink feedback transmission having repetitions. In cases where both feedback transmissions have repetitions, the UE may prioritize transmitting or receiving the transmission beginning in the earliest slot, or based on the sidelink feedback transmission having the greatest number of repetitions.

Aspects of the disclosure are initially described in the context of wireless communications systems. Aspects of the disclosure are further illustrated by and described with reference to apparatus diagrams, system diagrams, a sidelink resource configuration, sidelink feedback transmission prioritization schemes, a process flow, and flowcharts that relate to prioritization between feedback transmissions and receptions over sidelink.

FIG. 1 illustrates an example of a wireless communications system 100 that supports prioritization between feedback transmissions and receptions over sidelink in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low-latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some wireless communications systems, a UE 115 may communicate with one or more additional UEs 115 using sidelink communication channels. To support high reliability for sidelink transmissions, UEs 115 may transmit hybrid automatic repeat request acknowledgement (HARQ-ACK) feedback using a dedicated sidelink feedback channel such as a PSFCH. In some examples, the UEs 115 may transmit or receive a single-bit feedback transmission (e.g., a dedicated positive acknowledgement (ACK) bit or a dedicated negative acknowledgement (NACK) bit) to indicate either the successful or unsuccessful receipt of a sidelink data transmission. In some examples, the sidelink feedback channel (e.g., the PSFCH) may support feedback transmissions between sidelink UEs 115 that are multi-bit feedback transmissions. For example, a UE 115 may utilize multi-bit feedback in cases where the UE 115 is configured with multiple carriers in a carrier aggregation configuration, in cases where a sidelink UE 115 communicates with a number of other sidelink UEs 115, or in cases where the sidelink feedback has repetitions.

In some cases, however, a receiving sidelink UE 115 may identify that multiple sidelink feedback messages are scheduled to be transmitted or received concurrently (e.g., the sidelink feedback may overlap in time). If the UE 115 is unable to transmit/receive all of these sidelink feedback messages concurrently, the receiving sidelink UE 115 may determine which sidelink feedback message to prioritize. In some examples, the UE 115 may determine the priority level of the multi-bit sidelink feedback transmission by identifying a smallest priority field value (e.g., the highest priority level) among the priority field values corresponding to multiple HARQ bits of the multi-bit sidelink feedback. The UE 115 may compare the determined priority of the multi-bit feedback transmission to the priority of an overlapping feedback transmission (e.g., either a single bit sidelink feedback transmission or another multi-bit feedback transmission) to determine which sidelink feedback to prioritize receiving or transmitting.

In some other examples, in cases where the multi-bit sidelink feedback transmission has the same priority field value as the overlapping sidelink feedback transmission, the UE 115 may prioritize the transmission having the greatest number of HARQ feedback bits, or the UE 115 may prioritize the sidelink feedback transmissions based on a number of repetitions associated with the transmissions. In cases where the overlapping transmissions have the same number of repetitions, the UE 115 may prioritize transmitting or receiving the transmission beginning in the earliest slot.

Figure 2:
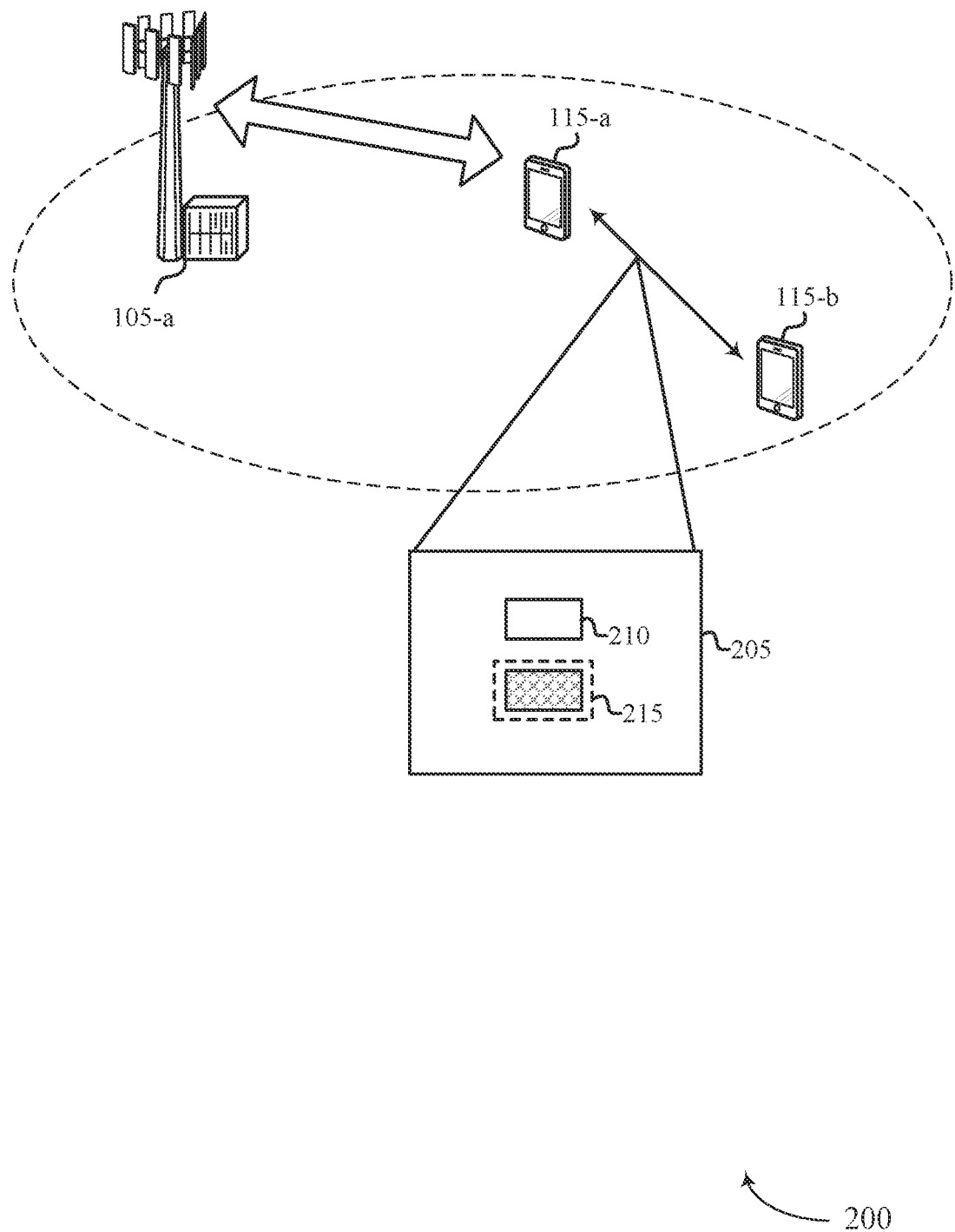
FIG. 2 illustrates an example of a wireless communications network that supports prioritization between feedback transmissions and receptions over sidelink in accordance with aspects of the present disclosure.

FIG. 2 illustrates an example of a wireless communications system 200 that supports prioritization between feedback transmissions and receptions over sidelink in accordance with aspects of the present disclosure. For example, the wireless communications system includes a base station 105-a which may communicate directly with a first UE 115-a. The first UE 115-a may communicate using a sidelink (e.g., a PC5 link) with a second UE 115-b. The base station 105-a and UEs 115-a and 115-b may be examples of a base station 105 and UEs 115 described with reference to FIG. 1.

In wireless communications system 200, a wireless device such as a UE 115-a may communicate with a base station 105-a using a direct link, and one or more additional UEs (e.g., UE 115-b) using sidelink communication channels, including sidelink data channels, sidelink control channels, or a combination thereof. To support high reliability for sidelink transmissions, the UEs may transmit hybrid automatic repeat request acknowledgement (HARQ-ACK) feedback using a dedicated sidelink feedback channel such as a physical sidelink feedback channel (PSFCH) 205. For example, in some cases, a receiving UE (e.g., UE 115-b) may receive a sidelink control channel or a sidelink shared channel transmission from a transmitting UE (e.g., UE 115-a), and the receiving UE 115-b may use dedicated sidelink feedback resources to send sidelink feedback information including a positive acknowledgement (ACK) or a negative acknowledgement (NACK) to indicate to either a successful or unsuccessful receipt of the sidelink channel transmission from the transmitting UE. Based on the sidelink feedback information, the transmitting UE 115-a may re-transmit the sidelink channel transmission to the receiving UE 115-b in cases where the receiving UE 115-b unsuccessfully receives the sidelink channel transmission. In some examples, the UEs may receive or transmit a single-bit feedback transmission (e.g., a dedicated ACK bit or a dedicated NACK bit) during each sidelink feedback channel transmission, and the receiving UE 115-b may receive an indication of the dedicated feedback bit that it may use to transmit feedback to the transmitting UE using the sidelink feedback channel.

In some examples, the sidelink feedback channel 205 (e.g., the PSFCH) may support feedback transmissions between sidelink UEs 115-a and 115-b that are multi-bit feedback transmissions that include more than one bit. UEs 115 may use multi-bit feedback in cases where the UEs 115 may benefit from transmitting multiple bits of feedback, for example, if UE 115-a or UE 115-b is configured with multiple carriers in a carrier aggregation configuration, a UE 115 may transmit or receive multiple bits of feedback corresponding to each carrier. In some other examples, a UE 115 may transmit a HARQ-ACK codebook that includes multiple HARQ-ACK bits corresponding to multiple transport blocks in the same sidelink feedback channel transmission. In some other examples, the UE 115 may transmit a number of repetitions of the multi-bit feedback transmission (e.g., PSFCH repetition) to further increase the reliability and the link budget of the multi-bit sidelink channel transmission.

In wireless communications system 200, a receiving UE 115-b may utilize a multi-bit feedback message to provide feedback for different portions of a sidelink channel transmission. For example, the transmitting UE 115-a may transmit a sidelink data channel (e.g., a physical sidelink shared channel (PSSCH)) using a single transport block which may include multiple code block groups (CBGs). In such examples, the receiving UE 115-b may transmit multi-bit feedback which allocates a single feedback bit for each code block group that is transmitted in the transport block conveying the sidelink data channel. In some other examples, the multi-bit feedback may include additional control information (e.g., channel status information (CSI), scheduling requests (SR), etc.) multiplexed with the sidelink feedback bit.

In some implementations, however, the receiving sidelink UE 115-b may identify multiple sidelink feedback messages to be transmitted or received concurrently (e.g., sidelink feedback messages 210 and 215), or the UE 115-b may determine that it is to transmit or receive a number of PSFCH transmissions (e.g., X PSFCHs) beyond its transmission or reception capabilities. For example, the UE 115-b may identify that a scheduled transmission or reception of a single-bit sidelink feedback message 210 overlaps with the scheduled transmission or reception of a multi-bit sidelink feedback message 215, or that the scheduled transmission or reception of the multi-bit sidelink feedback message overlaps with another scheduled multi-bit sidelink feedback message. In such cases, the UE 115-b may determine which sidelink feedback message to prioritize based on a number of factors or based on a priority rule associated with transmissions and receptions of the PSFCH. For example, in some cases the UE 115-b may receive a number of priority field values via sidelink control information associated with the sidelink feedback transmissions, and the UE 115-b may prioritize the sidelink feedback transmissions that are associated with a smaller priority field value (e.g., a smaller priority field value may indicate a higher priority transmission).

In cases where the UE 115-b transmits a first number of PSFCH transmissions (e.g., $N_{sch,Tx,PSFCH}$ PSFCHs) and receive a second number of PSFCH transmissions (e.g., $N_{sch,Rx,PSFCH}$ PSFCHs), the first number of PSFCH transmissions may overlap in time with the transmission or reception of the second number of PSFCHs. In such cases, the UE 115-b may transmit or receive a set of PSFCH messages corresponding to the smallest priority field value. In some cases, the UE 115-b may determine the priority field values via an indication in sidelink control information (SCI) (e.g., SCI format 1-A and SCI format 1-A that are respectively associated with a first set of priority field values associated with the $N_{sch,Tx,PSFCH}$ PSFCHs and a second set of priority field values associated with the $N_{sch,Rx,PSFCH}$ PSFCHs). In some examples, the UE 115-b may transmit $N_{Tx,PSFCH}$ PSFCHs corresponding to the smallest $N_{Tx,PSFCH}$ priority field values indicated in sidelink control information associated with the PSFCH transmission occasion. For example, each of the PSFCH transmissions may be associated with a priority field value. In cases of overlap for transmissions and reception of the PSFCH, the UE 115-b may compare the priority field values for the PSFCH transmissions such that if the highest priority is associated with the transmitted PSFCH, then the UE 115-b may transmit the PSFCH, and if the highest priority is associated with the received PSFCH, then the UE 115-b may receive the PSFCH.

The UE 115-b may employ a number of other techniques to determine the priority level of a multi-bit sidelink feedback transmission. In some examples, the UE 115-b may determine the priority level of the multi-bit PSFCH transmission by identifying the smallest priority field value (e.g., the highest priority level) among the priority field values corresponding to the HARQ feedback bits contained in the multi-bit PSFCH transmission. In such examples, the UE 115-b may assign the highest priority bit of the multi-bit feedback as the overall priority of the multi-bit feedback. The UE 115-b may compare the determined priority of the multi-bit feedback transmission to an overlapping feedback transmission to determine which transmission to prioritize. In some other examples, in cases where the multi-bit sidelink feedback transmission has the same priority field value as the overlapping feedback transmission, the UE 115-b may prioritize the transmission having the greatest number of HARQ feedback bits. In some other examples, in cases where the multi-bit PSFCH transmission has the same priority field value as the overlapping feedback transmission, the UE 115-*b* may prioritize the transmissions based on repetitions associated with the transmissions. For example, if the multi-bit feedback transmission has repetition, and the overlapping feedback transmission is a single-shot transmission (e.g., a feedback transmission that is transmitted once without repetition), the UE 115-*b* may prioritize the feedback transmission having repetitions. In cases where both feedback transmissions have repetitions, the UE 115-*b* may prioritize the transmission beginning in the earliest slot.

Figure 3:
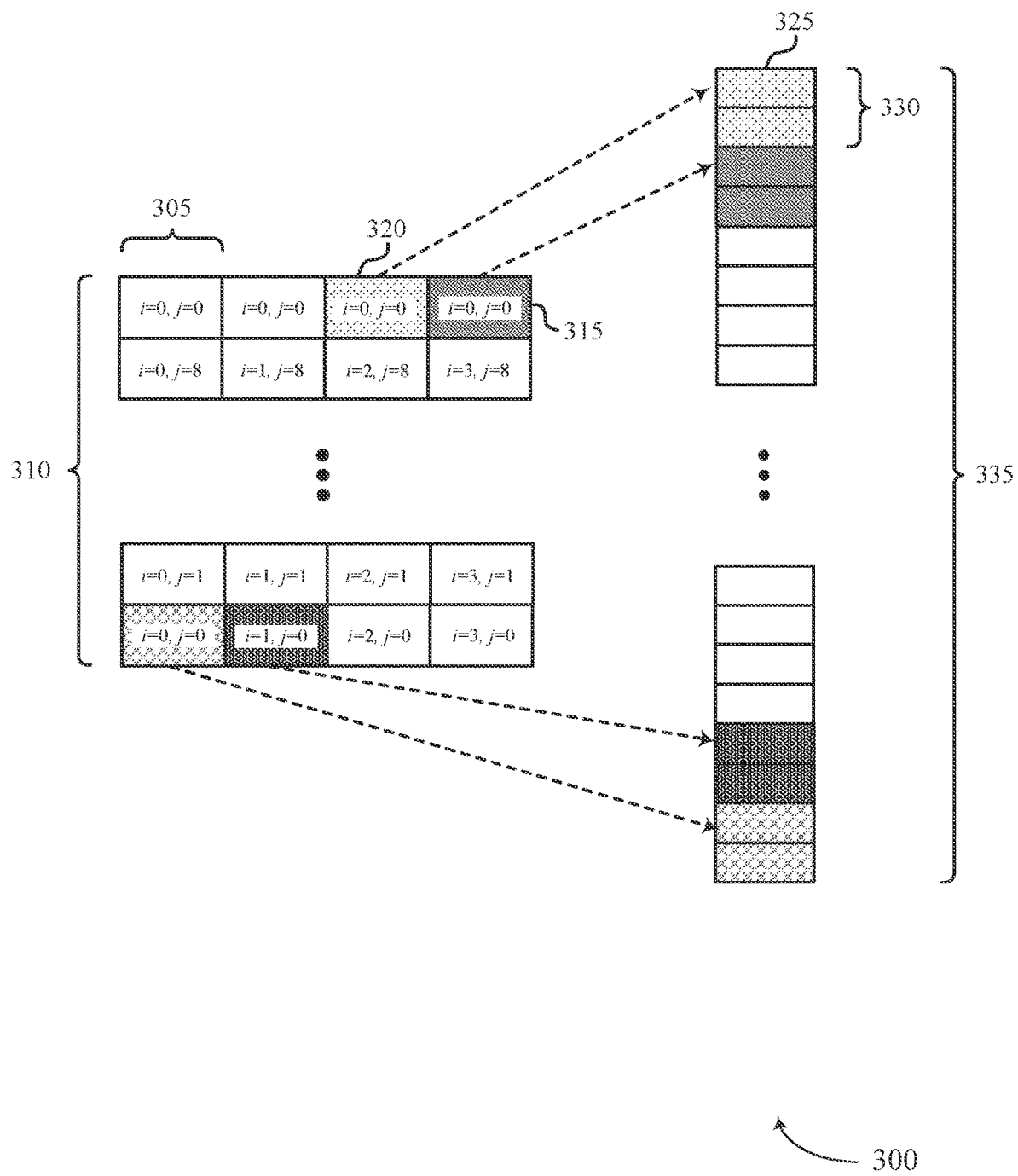
FIG. 3 illustrates an example of a sidelink feedback resource configuration that supports prioritization between feedback transmissions and receptions over sidelink in accordance with aspects of the present disclosure.

FIG. 3 illustrates an example of a sidelink feedback resource configuration 300 that supports prioritization between feedback transmissions and receptions over sidelink in accordance with aspects of the present disclosure. For example, sidelink feedback resource configuration 300 shows a mapping of sidelink shared channel resources to corresponding subchannels of a system bandwidth for transmission of sidelink feedback. In some examples, the sidelink resource configuration 300 may be used for the transmission of sidelink information and sidelink feedback between sidelink wireless devices (e.g., one or more UEs) in a wireless communications system such as wireless communications systems 100 and 200 described with reference to FIGS. 1 and 2. The sidelink resource configuration and associated sidelink feedback mapping described herein may apply to any number of sidelink resources and subchannel allocations.

Wireless devices such as UEs may communicate using sidelink channels (e.g., sidelink control channels, sidelink data channels, and sidelink feedback channels). In some examples, a wireless communications network may configure sidelink channel communications using a sidelink resource pool. For example, a set of resources of the resource pool may be configured for sidelink data transmissions and an additional set of resources of the resource pool may be configured for the transmission of sidelink feedback. In some cases, a resources used for transmission of sidelink data (e.g., a PSSCH) may correspond to resources for a transmission of sidelink feedback (e.g., a PSFCH). For example, if a UE uses a first set of resources to transmit a PSSCH, it may use corresponding resources to monitor for a PSFCH transmission carrying feedback associated with the transmitted PSSCH.

In some examples, a sidelink feedback transmission may include a number of sidelink HARQ bits. Sidelink HARQ may be sequence based, and may include one or more bits of feedback per corresponding PSSCH transmission. Further, a wireless device may transmit sidelink HARQ using two consecutive symbols; (e.g., symbols 11 and 12 of a slot), and one gap symbol may be assigned before and after a PSFCH occasion.

Sidelink feedback resource allocation 300 may include a set of slots 305 allocated as resources for transmission of the sidelink data channel, and a corresponding set of subchannels 310 to transmit the sidelink data (PSSCH). In some examples, a resource identification (i, j) may be given by a slot number denoted (i), and a subchannel number be denoted (j).

A transmission of the sidelink data may correspond to a transmission of sidelink feedback. For example, a wireless device may map resources for the sidelink data to a subset of resources in the PSFCH resource set 335. For example, the UE allocates $[(i+j \cdot N_{PSSCH}^{PSFCH}) \cdot M_{subch,slot}^{PSFCH}, (i+1+j \cdot N_{PSSCH}^{PSFCH}) \cdot M_{subch,slot}^{PSFCH}-1]$ physical resource blocks (PRBs) from $M_{PRB,set}^{PSFCH}$ PRBs to slot i and sub-channel j where $0 \leq i \leq N_{PSSCH}^{PSFCH}$ and $0 \leq j \leq N_{subch}$.

In the example of sidelink resource allocation, $N_{PSSCH}^{PSFCH}$ may be a PSFCH periodicity (e.g., equal to 4), $N_{subch}$ may be the number of subchannels for the resource pool (e.g., equal to 10), $M_{subch,slot}^{PSFCH}$ may be a number of PRBs for PSFCH (e.g., 80 PRBs for PSFCH).

In some examples, the PFSCH periodicity (e.g., the number of slots in a sidelink resource pool may be indicated by periodPSFCHresource. The periodicity may be set to {0, 1, 2, 4}. Sidelink feedback resource configuration 300, for example, may have a periodicity of 4. In cases in which the periodicity is set to 0, PSFCH transmissions from a UE in the resource pool are disabled. The UE may transmit the PSFCH in a first slot that includes PSFCH resources and is at least a number of slots, provided by MinTimeGapPSFCH, of the resource pool after a last slot of the PSSCH reception.

The number of resource blocks 335 (e.g., $M_{PRB,set}^{PSFCH}$ where $M_{PRB,set}^{PSFCH} = \alpha \cdot N_{subch} \cdot N_{PSSCH}^{PSFCH}$ and $$M_{subch,slot}^{PSFCH} = \frac{M_{PRB,set}^{PSFCH}}{N_{subch} \cdot N_{PSSCH}^{PSFCH}})$$

included in a resource pool may be indicated by rbSetPSFCH, and the number of subchannels 310 (e.g., $N_{subch}$ sub-channels) for the resource pool may be indicated by numSubchannel. $N_{PSSCH}^{PSFCH}$ may be a number of PSSCH slots associated with a PSFCH slot, which is determined by periodPSFCHresource.

Each sub-channel of the set of subchannels 310 may be associated with two PSFCH PRB allocated for sidelink feedback. In some cases, however the PSFCH transmission may be mapped to one of the two PRBs. For example, a first subchannel 320 having a first sidelink data transmission may be mapped to PRB set 330, and the sidelink feedback transmission may be mapped to PRB 325. In such examples, the mapping of the PSSCH may be one to many (e.g., a single PSSCH may be mapped to multiple PSFCH resources, and the UE selects one resource to use for transmission of feedback). In this case, the UE may select one of the two resources 330 based on a source and destination ID, (e.g., i=(source ID+destination ID) mod 2).

In some cases, the UE may identify multiple sidelink feedback messages with transmissions that are scheduled to overlap in time. For example, the UE may identify that a scheduled transmission or reception of a single-bit sidelink feedback message overlaps with the transmission or reception of a multi-bit sidelink feedback message, or that the transmission or reception of the multi-bit sidelink feedback message overlaps with another multi-bit sidelink feedback message. In such cases, the UE may determine which sidelink feedback message to prioritize based on a priority for transmissions and receptions of the PSFCH. For example, in some cases the UE may receive a number of priority field values in sidelink control information associated with the sidelink feedback transmissions, and the UE may prioritize the sidelink feedback transmissions that are associated with a higher priority. For example, the UE may prioritize multi-bit feedback transmissions or feedback repetitions over single bit or single-shot feedback transmissions (e.g., feedback transmissions that may not be repeated or retransmitted by the UE).

FIGS. 4A, 4B, and 4C illustrate examples of sidelink feedback prioritization schemes 400-*a*, 400-*b*, and 400-*c* that support prioritization between feedback transmissions and receptions over sidelink in accordance with aspects of the present disclosure. For example, sidelink feedback prioritization schemes 400 shows different selections of sidelink feedback transmissions. In some examples, prioritization between the transmission or reception of sidelink feedback may be made by wireless devices (e.g., one or more UEs) in a wireless communications system such as wireless communications systems 100 and 200 described with reference to FIGS. 1 and 2. The sidelink feedback prioritization schemes described herein may apply to any number of sidelink feedback transmissions or receptions.

In a first example, a wireless device such as a UE may receive sidelink control information (e.g., SCI format 1-A) which indicates a priority field value for a single bit sidelink feedback transmission, and a number of priority field values corresponding to the multiple feedback (e.g., HARQ-ACK) bits included in a multi-bit sidelink feedback transmission. In addition, the transmission or reception of a single bit sidelink feedback transmission (e.g., PSFCH) may overlap in time with the transmission or reception of a multi-bit sidelink feedback transmission (e.g., PSFCH). For example, a UE may communicate with several other sidelink UEs in a given time period such that multiple sidelink feedback transmissions (e.g., both single-bit and multi-bit sidelink feedback) overlap in time. In such cases, a wireless device such as a UE may determine the priority level of the multi-bit transmission based on the smallest priority field value (i.e., the highest priority level) among the priority field values indicated in the sidelink control information corresponding to the multiple bits contained in the multi-bit sidelink feedback transmission.

In cases that a UE is to determine a priority order between the one-bit PSFCH and the multi-bit PSFCH transmission, the UE may compare the priority field value of the one-bit PSFCH with the determined priority level (e.g., the smallest priority field value) of all of the bits of the multi-bit PSFCH. For example, the UE may prioritize the transmission or reception of the PSFCH that has a higher priority (e.g., smaller priority field value). In other words, a wireless device may assign the highest priority level associated with any one of the bits of the multi-bit PSFCH as the priority of the multi-bit transmission.

In sidelink feedback prioritization scheme 400-a, a wireless device may make a selection 405 to transmit or receive the multi-bit feedback based on the priority of the multi-bit feedback being higher than the single-bit feedback. For example, the priority field value associated with the single bit feedback may be higher (corresponding to a lower overall priority) than a priority field value associated with the multi-bit feedback. In some other examples, the single-bit feedback may have the same priority field value as the multi-bit feedback. In such cases, the wireless device may prioritize the multi-bit feedback over the single-bit feedback. For example, the wireless device may prioritize the transmission or reception that carries more HARQ-ACK bits.

In some cases, a first feedback transmission may include a first number of bits (e.g., K1 bits) and a second feedback may include a second number of bits (e.g., K2 bits). In some examples, the first feedback transmission and the second feedback may be multi-bit feedback transmissions, where the number of bits may be expressed as 1≤K1<K2. In some cases, the wireless device may determine that the first feedback transmission at least partially overlaps in time (e.g., collides) with the second feedback, and the wireless device may compare priority field values for the feedback transmissions. In examples where the priority field values for the K1 and K2 bits are the same, the wireless device may prioritize the transmission or reception of the second feedback (e.g., the feedback transmission having K2 bits) based on the number of bits of the second feedback (K2) being greater than the number of bits of the first feedback transmission (K1).

In some other examples, the wireless device may support CBG-based HARQ-ACK feedback, and the number of bits used for prioritization between overlapping sidelink feedback may be determine "one bit per CBG" or "one bit per transport block (TB)." For example, multiple bits may correspond to a single TB in cases where the wireless device uses CBG-based HARQ-ACK feedback, and there may be single bit feedback and multiple bit feedback corresponding to a single TB. In such cases, the wireless device may prioritize the feedback corresponding to the greatest number of TBs. For example, if a first sidelink feedback transmission has 2 bits corresponding to 2 TBs, and a second sidelink feedback transmission has 10 bits corresponding to a single TB, the wireless device may prioritize the transmission or reception of the 2-TB sidelink feedback even though there are less total bits associated with the transmission or reception (e.g., the number of bits used for prioritization may be different from the actual number of bits carried in the PSFCH).

Sidelink feedback prioritization scheme 400-b shows a case where a 1-bit sidelink feedback overlaps with multi-bit sidelink feedback (with repetition), and the wireless device may determine that the priority field values associated with both sidelink feedbacks are the same. In such cases, the wireless device may prioritize the overlapping multi-bit sidelink feedback 410 based on the multi-bit feedback having repetition. In other words, in cases where a single-shot PSFCH (e.g., a PSFCH transmitted once, or without repetition) overlaps in time with a PSFCH repetition, the wireless device may prioritize the PSFCH repetition. In such cases, the wireless device may determine priority only for overlapping transmissions (e.g., the wireless device may transmit or receive non-overlapping feedback transmissions without considering priority). Additionally or alternatively, a PSFCH transmission having more repetitions may be prioritized over a PSFCH transmission having fewer repetitions. In some further examples of 400-b, both feedback transmissions may be multi-bit feedback transmissions, and the wireless device may prioritize the multi-bit feedback transmission having repetition.

Sidelink feedback prioritization scheme 400-c shows a case where a number of repetitions of single-bit sidelink feedback partially overlaps in time with a number of repetitions of multi-bit sidelink feedback. In such cases, the wireless device may prioritize the sidelink feedback transmission or reception that begins earlier (e.g., earlier in time). For example, if one repetition of sidelink feedback starts at slot 0 and another repetition starts at slot 5, then the wireless device may prioritize the transmission that starts in slot 0. In such cases, the wireless device may apply such priority considerations to overlapping slots (e.g., slots selected at 415), and non-overlapping slots may be transmitted or received normally. In some further examples of 400-c, both feedback transmissions may multi-bit feedback transmissions, and the wireless device may prioritize the multi-bit feedback transmission beginning earlier.

In some examples, a wireless device may apply multiple priority considerations for a single priority determination. For example, a wireless device may determine that overlapping sidelink feedback transmission have the same number of feedback (e.g., HARQ-ACK) bits, and the wireless device may determine to transmit or receive the sidelink feedback having a greater number of repetitions. Additionally or alternatively, if the wireless device first determines that the overlapping feedback transmissions have the same number of repetitions, the wireless device may prioritize receiving or transmitting the sidelink feedback having a greater number of feedback bits.

Figure 5:
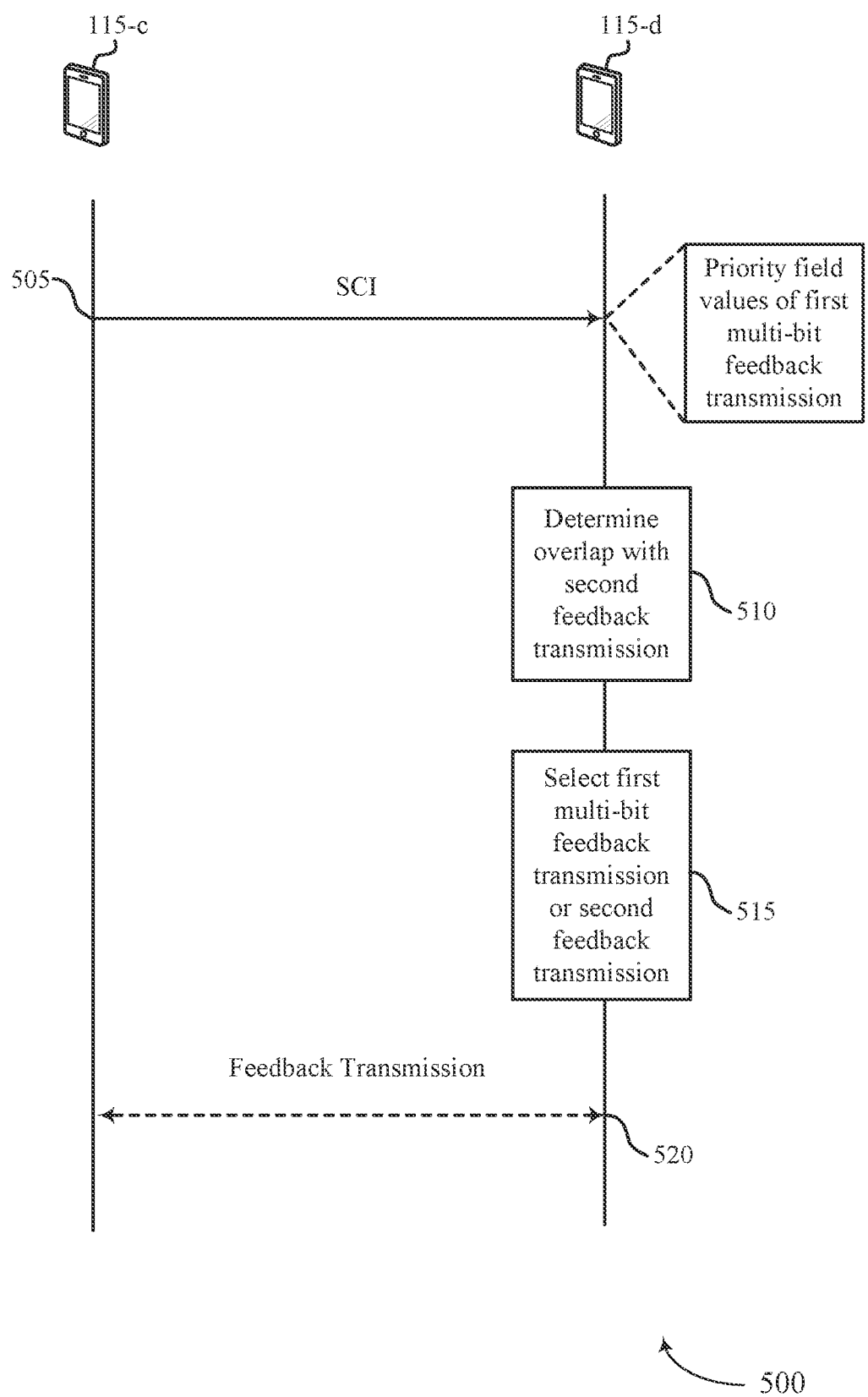
FIG. 5 illustrates an example of a process flow that supports prioritization between feedback transmissions and receptions over sidelink in accordance with aspects of the present disclosure.

FIG. 5 illustrates an example of a process flow 500 that supports prioritization between feedback transmissions and receptions over sidelink in accordance with aspects of the present disclosure. For example, the process flow 500 includes transmitting sidelink UE 115-c (e.g., a first UE 115-c) and a receiving sidelink UE 115-d (e.g., a second UE 115-d), which may be examples of wireless devices such as UEs 115 described with reference to FIGS. 1 and 2. Alternative examples of the following may be implemented, where some steps are performed in a different order than described or are not performed at all. In some cases, steps may include additional features not mentioned below, or further steps may be added. In addition, while process flow 500 shows processes between a two sidelink UEs, it should be understood that these processes may occur between any number of network devices.

At 505, the second UE 115-d may receive, from a first UE 115-c, one or more SCI messages scheduling a first multi-bit feedback for the second UE 115-d, and indicating a set of priority field values associated with respective feedback bits (e.g., HARQ feedback bits) of the first multi-bit feedback. In some examples, a first priority of the first multi-bit feedback corresponds to a highest priority of the plurality of priority field values.

At 510, the second UE 115-d may determine that a first set of resources allocated for the first multi-bit feedback at least partially overlaps with a second set of resources allocated for a second feedback having a second priority.

At 515, the second UE 115-d may select one of the first multi-bit feedback or the second feedback (e.g., a multi-bit feedback or a single-bit feedback transmission) based on the first priority of the first multi-bit feedback and the second priority of the second feedback.

In some examples, the second UE 115-d may select the first multi-bit feedback over the first set of resource based on the first priority allocated for the first multi-bit feedback being higher than the second priority associated with the second feedback. For example, a priority field value corresponding to the first priority may be smaller than a second priority field value corresponding to the second priority. In some examples, the second UE 115-d may determine that the first priority of the first multi-bit feedback is equal to the second priority of the second feedback, and may compare a number of feedback bits of the first multi-bit feedback to a number of feedback bits of the second feedback to determine which feedback has a greater number of feedback bits. The second UE 115-d may select the first multi-bit feedback or the second feedback for transmitting or receiving based on the comparing.

In some cases, the second UE 115-d may determine that the first multi-bit feedback is associated with a first number of transport blocks and the second feedback is associated with a second number of transport blocks. The second UE 115-d may select the first multi-bit feedback or the second feedback for transmitting or receiving based on the feedback transmission that is associated with a greater number of transport blocks.

In some examples, the second UE 115-d may determine that the first priority of the first multi-bit feedback is equal to the second priority of the second feedback (e.g., a single-shot feedback transmission), and that the first multi-bit feedback includes a first set of feedback bit repetitions (e.g., PSFCH repetitions). The second UE 115-d may select the first multi-bit feedback for transmitting or receiving based on the first multi-bit feedback including repetitions.

In some examples, the second UE 115-d may determine that the second feedback includes a second set of feedback bit repetitions, and the second UE 115-d may select the first multi-bit feedback for transmitting or receiving based on the first multi-bit feedback occurring before the second feedback.

In some examples, the second UE 115-d may determine that the first multi-bit feedback occurs concurrently with the second feedback. The second UE 115-d may select the first multi-bit feedback for transmitting or receiving based on the first multi-bit feedback including a greater number of feedback bits than the second feedback.

In some examples, the second UE 115-d may determine that the second feedback includes a second set of feedback bit repetitions. The second UE 115-d may select the first multi-bit feedback for transmitting or receiving based on the first set of feedback bit repetitions having a greater number of repetitions than the second set of feedback bit repetitions. In some cases, the first multi-bit feedback and the second feedback may have an equal number of feedback bits.

In some examples, the UE 115-d may determine that the second feedback includes a second set of feedback bit repetitions, and that at least a portion of the first set of feedback bit repetitions are non-overlapping with the second set of feedback bit repetitions. The second UE 115-d may transmit or receive at least the portion of the first set of feedback bit repetitions and the second set of feedback bit repetitions that are non-overlapping. At 520, the second UE 115-d may transmit or receive, the selected one of the first multi-bit feedback or the second feedback.

Figure 6:
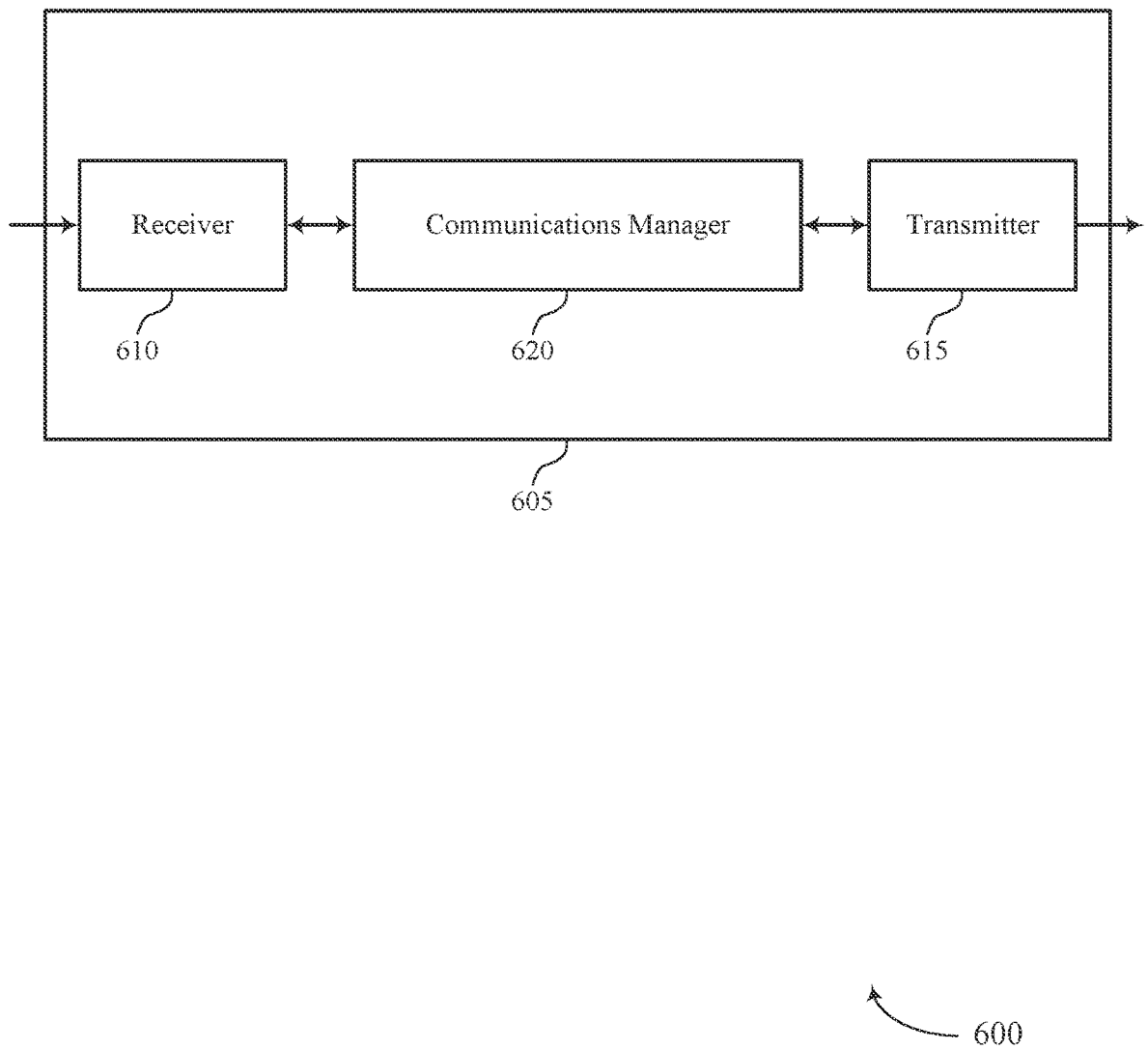
FIGS. 6 and 7 show block diagrams of devices that support prioritization between feedback transmissions and receptions over sidelink in accordance with aspects of the present disclosure.

FIG. 6 shows a block diagram 600 of a device 605 that supports prioritization between feedback transmissions and receptions over sidelink in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to prioritization between feedback transmissions and receptions over sidelink). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to prioritization between feedback transmissions and receptions over sidelink). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of prioritization between feedback transmissions and receptions over sidelink as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a first wireless device in accordance with examples as disclosed herein. For example, the communications manager 620 may be configured as or otherwise support a means for receiving, from a second wireless device, one or more sidelink control information messages scheduling a first multi-bit feedback and indicating a set of multiple priority field values associated with respective feedback bits of the first multi-bit feedback, where a first priority of the first multi-bit feedback corresponds to a highest priority of the set of multiple priority field values. The communications manager 620 may be configured as or otherwise support a means for determining that a first set of resources allocated for the first multi-bit feedback at least partially overlaps with a second set of resources allocated for a second feedback having a second priority. The communications manager 620 may be configured as or otherwise support a means for selecting one of the first multi-bit feedback or the second feedback based on the first priority of the first multi-bit feedback and the second priority of the second feedback. The communications manager 620 may be configured as or otherwise support a means for transmitting or receiving, the selected one of the first multi-bit feedback or the second feedback.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for more efficient utilization of communication resources, reduced latency, and increased reliability.

Figure 7:
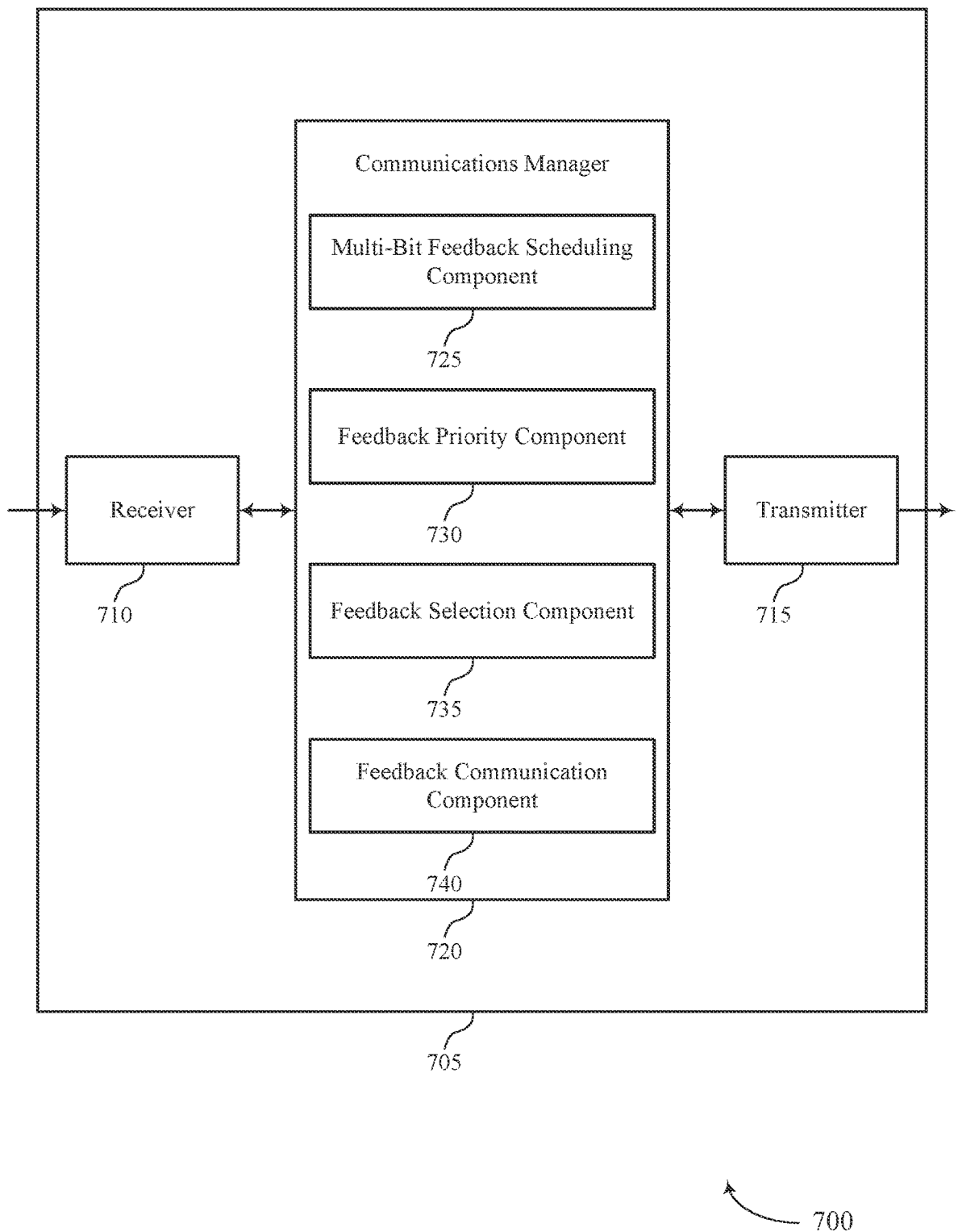

FIG. 7 shows a block diagram 700 of a device 705 that supports prioritization between feedback transmissions and receptions over sidelink in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to prioritization between feedback transmissions and receptions over sidelink). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to prioritization between feedback transmissions and receptions over sidelink). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of prioritization between feedback transmissions and receptions over sidelink as described herein. For example, the communications manager 720 may include a multi-bit feedback scheduling component 725, a feedback priority component 730, a feedback selection component 735, a feedback communication component 740, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a first wireless device in accordance with examples as disclosed herein. The multi-bit feedback scheduling component 725 may be configured as or otherwise support a means for receiving, from a second wireless device, one or more sidelink control information messages scheduling a first multi-bit feedback and indicating a set of multiple priority field values associated with respective feedback bits of the first multi-bit feedback, where a first priority of the first multi-bit feedback corresponds to a highest priority of the set of multiple priority field values. The feedback priority component 730 may be configured as or otherwise support a means for determining that a first set of resources allocated for the first multi-bit feedback at least partially overlaps with a second set of resources allocated for a second feedback having a second priority. The feedback selection component 735 may be configured as or otherwise support a means for selecting one of the first multi-bit feedback or the second feedback based on the first priority of the first multi-bit feedback and the second priority of the second feedback. The feedback communication component 740 may be configured as or otherwise support a means for transmitting or receiving, the selected one of the first multi-bit feedback or the second feedback.

Figure 8:
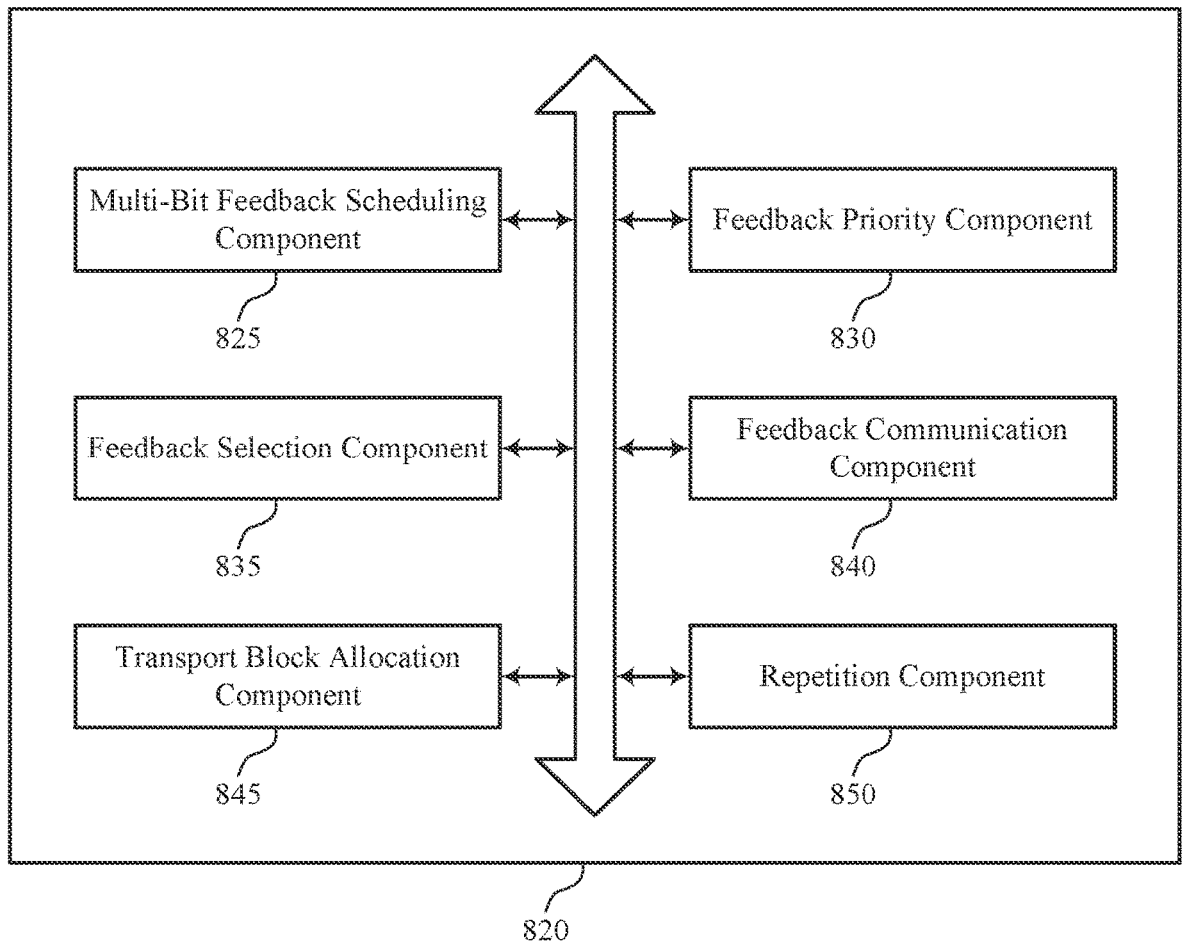
FIG. 8 shows a block diagram of a communications manager that supports prioritization between feedback transmissions and receptions over sidelink in accordance with aspects of the present disclosure.

FIG. 8 shows a block diagram 800 of a communications manager 820 that supports prioritization between feedback transmissions and receptions over sidelink in accordance with aspects of the present disclosure. The communications manager 820 may be an example of aspects of a communications manager 620, a communications manager 720, or both, as described herein. The communications manager 820, or various components thereof, may be an example of means for performing various aspects of prioritization between feedback transmissions and receptions over sidelink as described herein. For example, the communications manager 820 may include a multi-bit feedback scheduling component 825, a feedback priority component 830, a feedback selection component 835, a feedback communication component 840, a transport block allocation component 845, a repetition component 850, or any combination thereof. Each of these components may communicate, directly or indirectly, with one another (e.g., via one or more buses).

The communications manager 820 may support wireless communications at a first wireless device in accordance with examples as disclosed herein. The multi-bit feedback scheduling component 825 may be configured as or otherwise support a means for receiving, from a second wireless device, one or more sidelink control information messages scheduling a first multi-bit feedback and indicating a set of multiple priority field values associated with respective feedback bits of the first multi-bit feedback, where a first priority of the first multi-bit feedback corresponds to a highest priority of the set of multiple priority field values. The feedback priority component 830 may be configured as or otherwise support a means for determining that a first set of resources allocated for the first multi-bit feedback at least partially overlaps with a second set of resources allocated for a second feedback having a second priority. The feedback selection component 835 may be configured as or otherwise support a means for selecting one of the first multi-bit feedback or the second feedback based on the first priority of the first multi-bit feedback and the second priority of the second feedback. The feedback communication component 840 may be configured as or otherwise support a means for transmitting or receiving, the selected one of the first multi-bit feedback or the second feedback.

In some examples, to support selecting one of the first multi-bit feedback or the second feedback, the feedback selection component 835 may be configured as or otherwise support a means for selecting the first multi-bit feedback for transmission or reception over the first set of resources based on the first priority being higher than the second priority.

In some examples, a first priority field value corresponding to the first priority is smaller than a second priority field value corresponding to the second priority. In some examples, the feedback priority component 830 may receive, from the second wireless device, a priority field value associated with the second feedback, where the priority field value associated with the second feedback corresponds to the second priority of the second feedback In some examples, to support selecting one of the first multi-bit feedback or the second feedback, the feedback priority component 830 may be configured as or otherwise support a means for determining that the first priority of the first multi-bit feedback is equal to the second priority of the second feedback, and the feedback priority component may compare a number of feedback bits of the first multi-bit feedback to a number of feedback bits of the second feedback to determine which feedback has a greater number of feedback bits. In some examples, to support selecting one of the first multi-bit feedback or the second feedback, the feedback selection component 835 may be configured as or otherwise support a means for selecting the first multi-bit feedback or the second feedback for transmitting or receiving based on the first multi-bit feedback or the second feedback having a greater number of feedback bits.

In some examples, to support selecting one of the first multi-bit feedback or the second feedback, the transport block allocation component 845 may be configured as or otherwise support a means for determining that the first multi-bit feedback is associated with a first number of transport blocks and the second feedback is allocated for a second number of transport blocks. In some examples, to support selecting one of the first multi-bit feedback or the second feedback, the transport block allocation component 845 may be configured as or otherwise support a means for selecting the first multi-bit feedback or the second feedback for transmitting or receiving based on the respective feedback transmission that is associated with a greater number of transport blocks.

In some examples, to support selecting one of the first multi-bit feedback or the second feedback, the repetition component 850 may be configured as or otherwise support a means for determining that the first priority of the first multi-bit feedback is equal to the second priority of the second feedback, where the first multi-bit feedback includes a first set of feedback bit repetitions. In some examples, to support selecting one of the first multi-bit feedback or the second feedback, the feedback selection component 835 may be configured as or otherwise support a means for selecting the first multi-bit feedback for transmitting or receiving based on the first multi-bit feedback including the first set of feedback bit repetitions. In some examples, the second feedback includes a single-shot feedback transmission.

In some examples, to support selecting one of the first multi-bit feedback or the second feedback, the repetition component 850 may be configured as or otherwise support a means for determining the second feedback includes a second set of feedback bit repetitions. In some examples, to support selecting one of the first multi-bit feedback or the second feedback, the feedback selection component 835 may be configured as or otherwise support a means for selecting the first multi-bit feedback for transmitting or receiving based on the first multi-bit feedback occurring before the second feedback.

In some examples, to support selecting one of the first multi-bit feedback or the second feedback, the repetition component 850 may be configured as or otherwise support a means for determining that the first multi-bit feedback occurs concurrently with the second feedback. In some examples, to support selecting one of the first multi-bit feedback or the second feedback, the feedback selection component 835 may be configured as or otherwise support a means for selecting the first multi-bit feedback for transmitting or receiving based on the first multi-bit feedback including a greater number of feedback bits.

In some examples, to support selecting one of the first multi-bit feedback or the second feedback, the repetition component 850 may be configured as or otherwise support a means for determining the second feedback includes a second set of feedback bit repetitions. In some examples, to support selecting one of the first multi-bit feedback or the second feedback, the feedback selection component 835 may be configured as or otherwise support a means for selecting the first multi-bit feedback for transmitting or receiving based on the first set of feedback bit repetitions having a greater number of repetitions than the second set of feedback bit repetitions.

In some examples, the first multi-bit feedback and the second feedback have an equal number of feedback bits.

In some examples, the repetition component 850 may be configured as or otherwise support a means for determining the second feedback includes a second set of feedback bit repetitions, where at least a portion of the first set of feedback bit repetitions are non-overlapping with the second set of feedback bit repetitions. In some examples, the feedback communication component 840 may be configured as or otherwise support a means for transmitting or receiving at least the portion of the first set of feedback bit repetitions and the second set of feedback bit repetitions that are non-overlapping.

In some examples, the respective feedback bits of the first multi-bit feedback include a set of multiple HARQ bits responsive to at least one sidelink shared channel transmission.

In some examples, the second priority of the second feedback corresponds to an additional highest priority of one or more priority field values associated with respective feedback bits of the second feedback.

Figure 9:
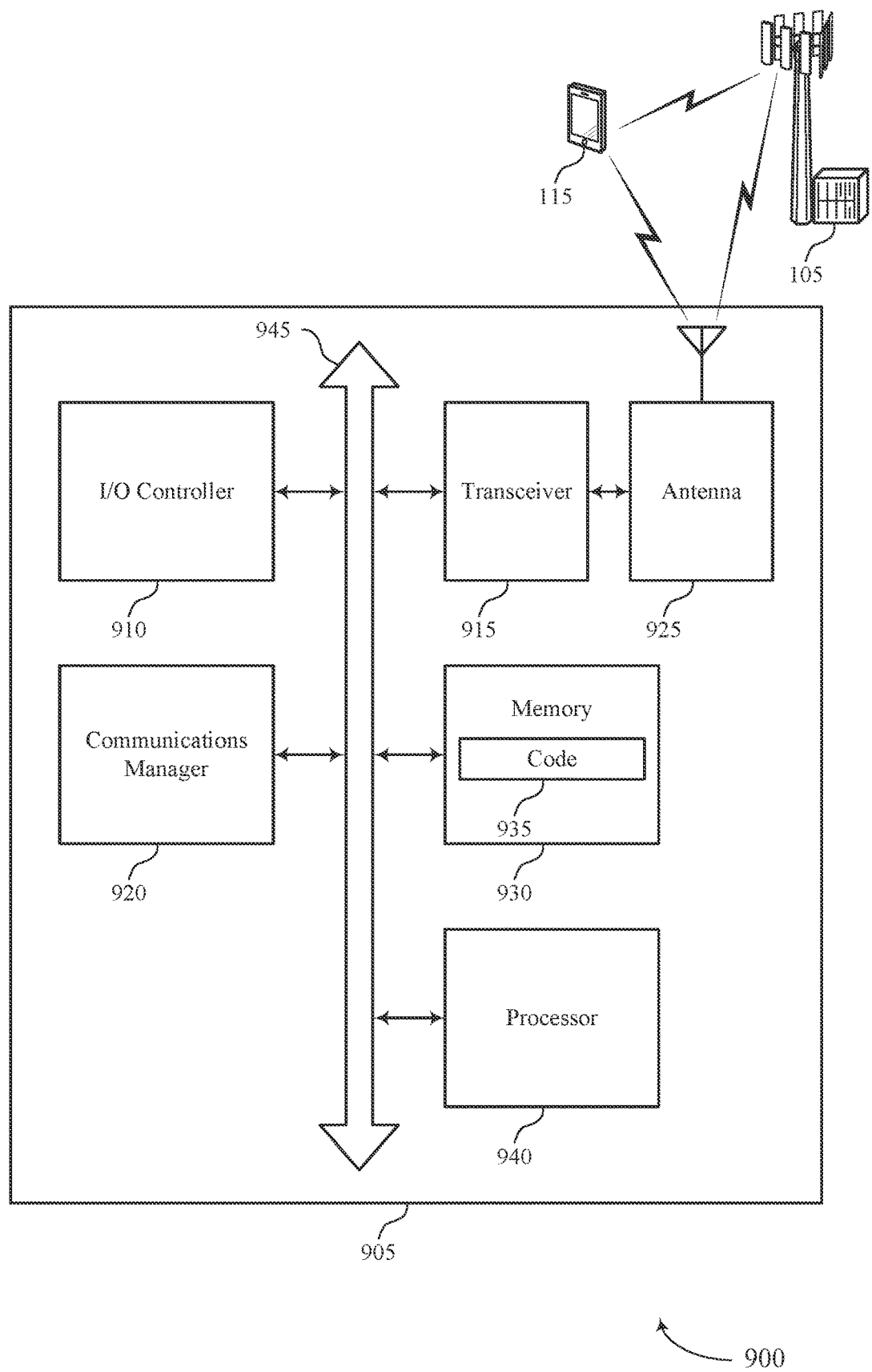
FIG. 9 shows a diagram of a system including a device that supports prioritization between feedback transmissions and receptions over sidelink in accordance with aspects of the present disclosure.

FIG. 9 shows a diagram of a system 900 including a device 905 that supports prioritization between feedback transmissions and receptions over sidelink in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting prioritization between feedback transmissions and receptions over sidelink). For example, the device 905 or a component of the device 905 may include a processor 940 and memory 930 coupled to the processor 940, the processor 940 and memory 930 configured to perform various functions described herein.

The communications manager 920 may support wireless communications at a first wireless device in accordance with examples as disclosed herein. For example, the communications manager 920 may be configured as or otherwise support a means for receiving, from a second wireless device, one or more sidelink control information messages scheduling a first multi-bit feedback and indicating a set of multiple priority field values associated with respective feedback bits of the first multi-bit feedback, where a first priority of the first multi-bit feedback corresponds to a highest priority of the set of multiple priority field values. The communications manager 920 may be configured as or otherwise support a means for determining that a first set of resources allocated for the first multi-bit feedback at least partially overlaps with a second set of resources allocated for a second feedback having a second priority. The communications manager 920 may be configured as or otherwise support a means for selecting one of the first multi-bit feedback or the second feedback based on the first priority of the first multi-bit feedback and the second priority of the second feedback. The communications manager 920 may be configured as or otherwise support a means for transmitting or receiving, the selected one of the first multi-bit feedback or the second feedback.

By including or configuring the communications manager 920 in accordance with examples as described herein, the device 905 may support techniques for improved communication reliability, reduced latency, improved user experience related to higher reliability, reduced power consumption, more efficient utilization of communication resources, and improved coordination between sidelink devices.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of prioritization between feedback transmissions and receptions over sidelink as described herein, or the processor 940 and the memory 930 may be otherwise configured to perform or support such operations.

Figure 10:
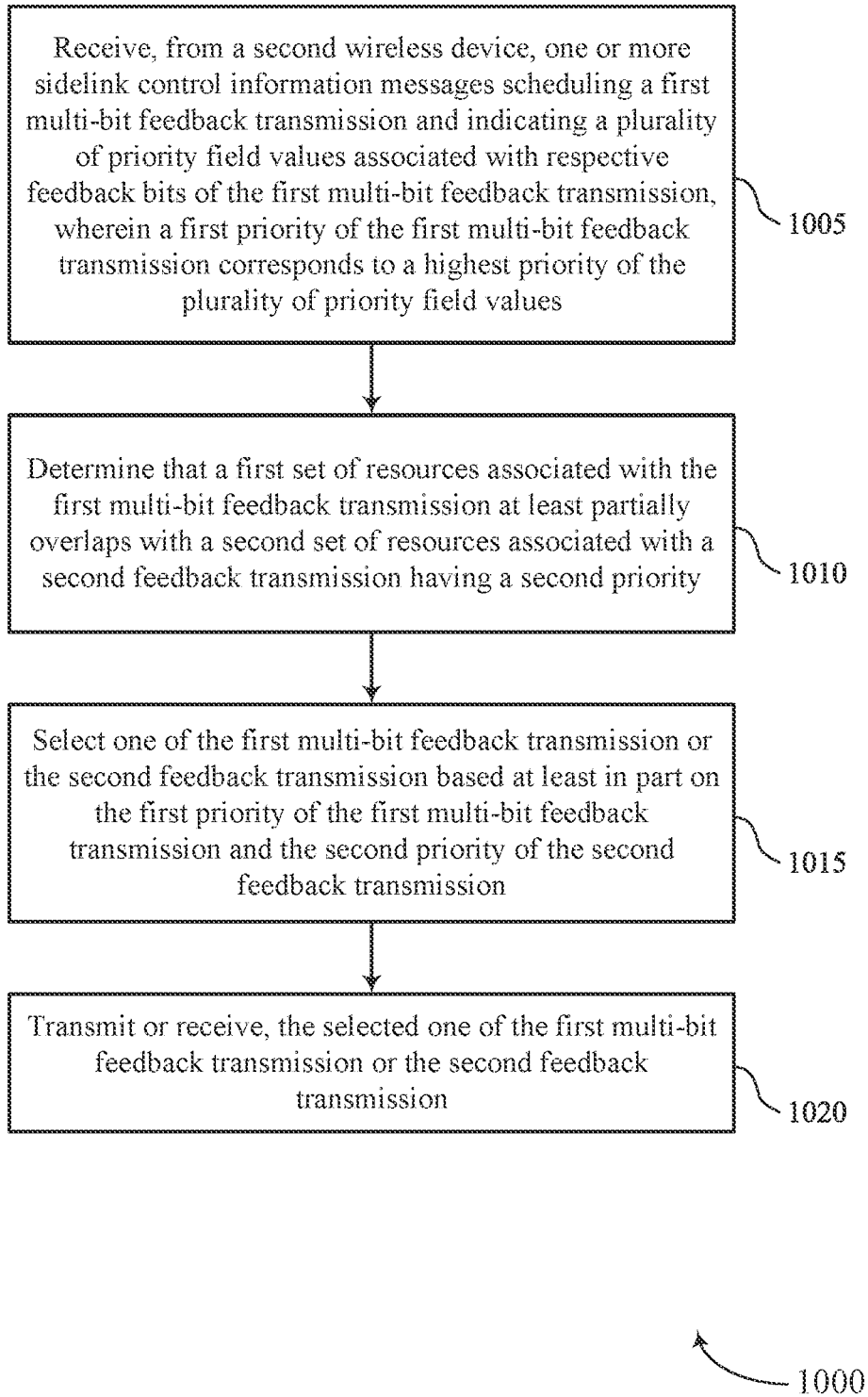
FIGS. 10 through 14 show flowcharts illustrating methods that support prioritization between feedback transmissions and receptions over sidelink in accordance with aspects of the present disclosure.

FIG. 10 shows a flowchart illustrating a method 1000 that supports prioritization between feedback transmissions and receptions over sidelink in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1005, the method may include receiving, from a second wireless device, one or more sidelink control information messages scheduling a first multi-bit feedback and indicating a set of multiple priority field values associated with respective feedback bits of the first multi-bit feedback, where a first priority of the first multi-bit feedback corresponds to a highest priority of the set of multiple priority field values. The operations of 1005 may be performed in accordance with examples as disclosed herein. In some examples, aspects of the operations of 1005 may be performed by a multi-bit feedback scheduling component 825 as described with reference to FIG. 8.

At 1010, the method may include determining that a first set of resources allocated for the first multi-bit feedback at least partially overlaps with a second set of resources allocated for a second feedback having a second priority. The operations of 1010 may be performed in accordance with examples as disclosed herein. In some examples, aspects of the operations of 1010 may be performed by a feedback priority component 830 as described with reference to FIG. 8.

At 1015, the method may include selecting one of the first multi-bit feedback or the second feedback based on the first priority of the first multi-bit feedback and the second priority of the second feedback. The operations of 1015 may be performed in accordance with examples as disclosed herein. In some examples, aspects of the operations of 1015 may be performed by a feedback selection component 835 as described with reference to FIG. 8.

At 1020, the method may include transmitting or receiving, the selected one of the first multi-bit feedback or the second feedback. The operations of 1020 may be performed in accordance with examples as disclosed herein. In some examples, aspects of the operations of 1020 may be performed by a feedback communication component 840 as described with reference to FIG. 8.

Figure 11:
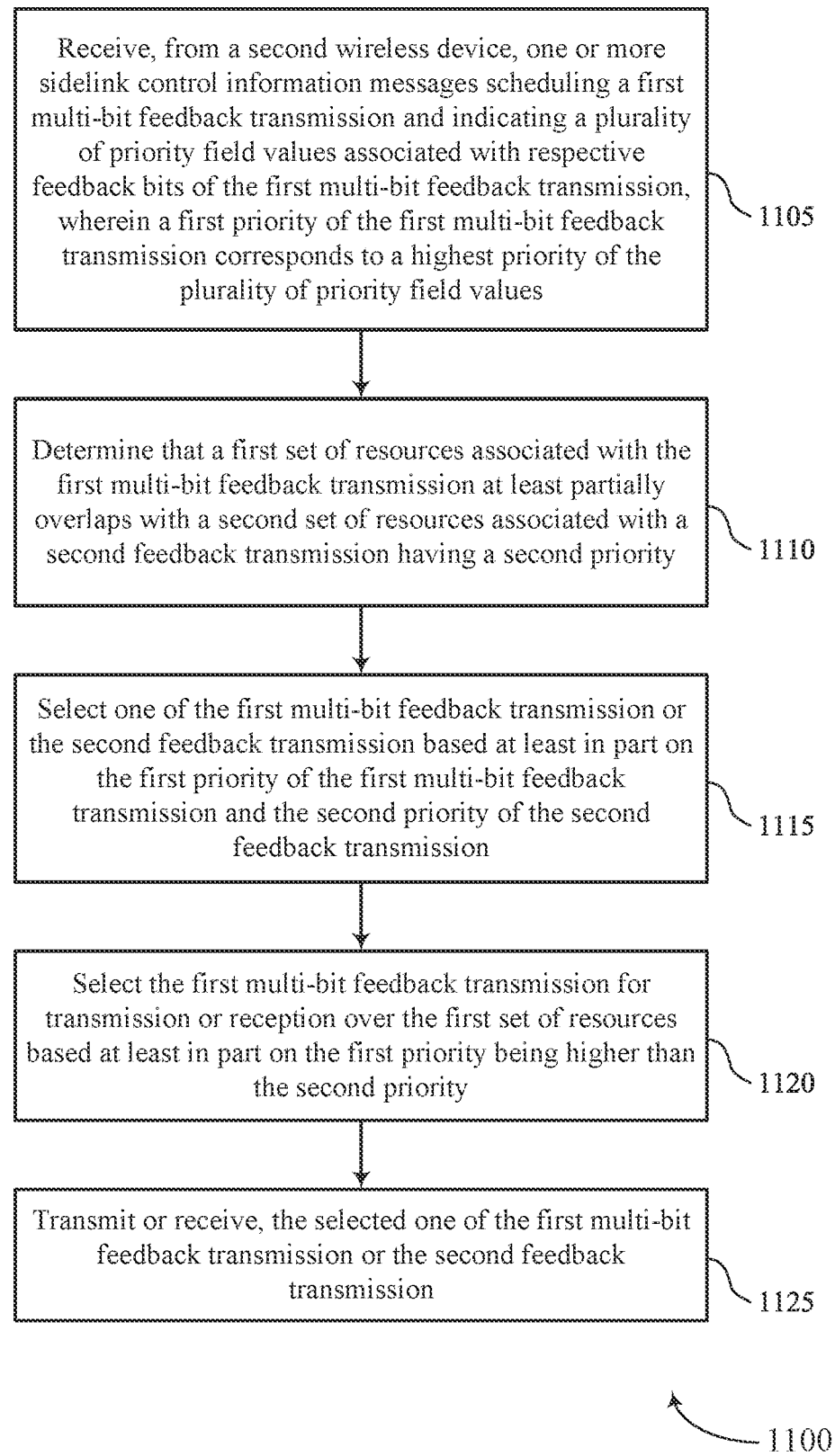

FIG. 11 shows a flowchart illustrating a method 1100 that supports prioritization between feedback transmissions and receptions over sidelink in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1105, the method may include receiving, from a second wireless device, one or more sidelink control information messages scheduling a first multi-bit feedback and indicating a set of multiple priority field values associated with respective feedback bits of the first multi-bit feedback, where a first priority of the first multi-bit feedback corresponds to a highest priority of the set of multiple priority field values. The operations of 1105 may be performed in accordance with examples as disclosed herein. In some examples, aspects of the operations of 1105 may be performed by a multi-bit feedback scheduling component 825 as described with reference to FIG. 8.

At 1110, the method may include determining that a first set of resources allocated for the first multi-bit feedback at least partially overlaps with a second set of resources allocated for a second feedback having a second priority. The operations of 1110 may be performed in accordance with examples as disclosed herein. In some examples, aspects of the operations of 1110 may be performed by a feedback priority component 830 as described with reference to FIG. 8.

At 1115, the method may include selecting one of the first multi-bit feedback or the second feedback based on the first priority of the first multi-bit feedback and the second priority of the second feedback. The operations of 1115 may be performed in accordance with examples as disclosed herein. In some examples, aspects of the operations of 1115 may be performed by a feedback selection component 835 as described with reference to FIG. 8.

At 1120, the method may include selecting the first multi-bit feedback for transmission or reception over the first set of resources based on the first priority being higher than the second priority. The operations of 1120 may be performed in accordance with examples as disclosed herein. In some examples, aspects of the operations of 1120 may be performed by a feedback selection component 835 as described with reference to FIG. 8.

At 1125, the method may include transmitting or receiving, the selected one of the first multi-bit feedback or the second feedback. The operations of 1125 may be performed in accordance with examples as disclosed herein. In some examples, aspects of the operations of 1125 may be performed by a feedback communication component 840 as described with reference to FIG. 8.

Figure 12:
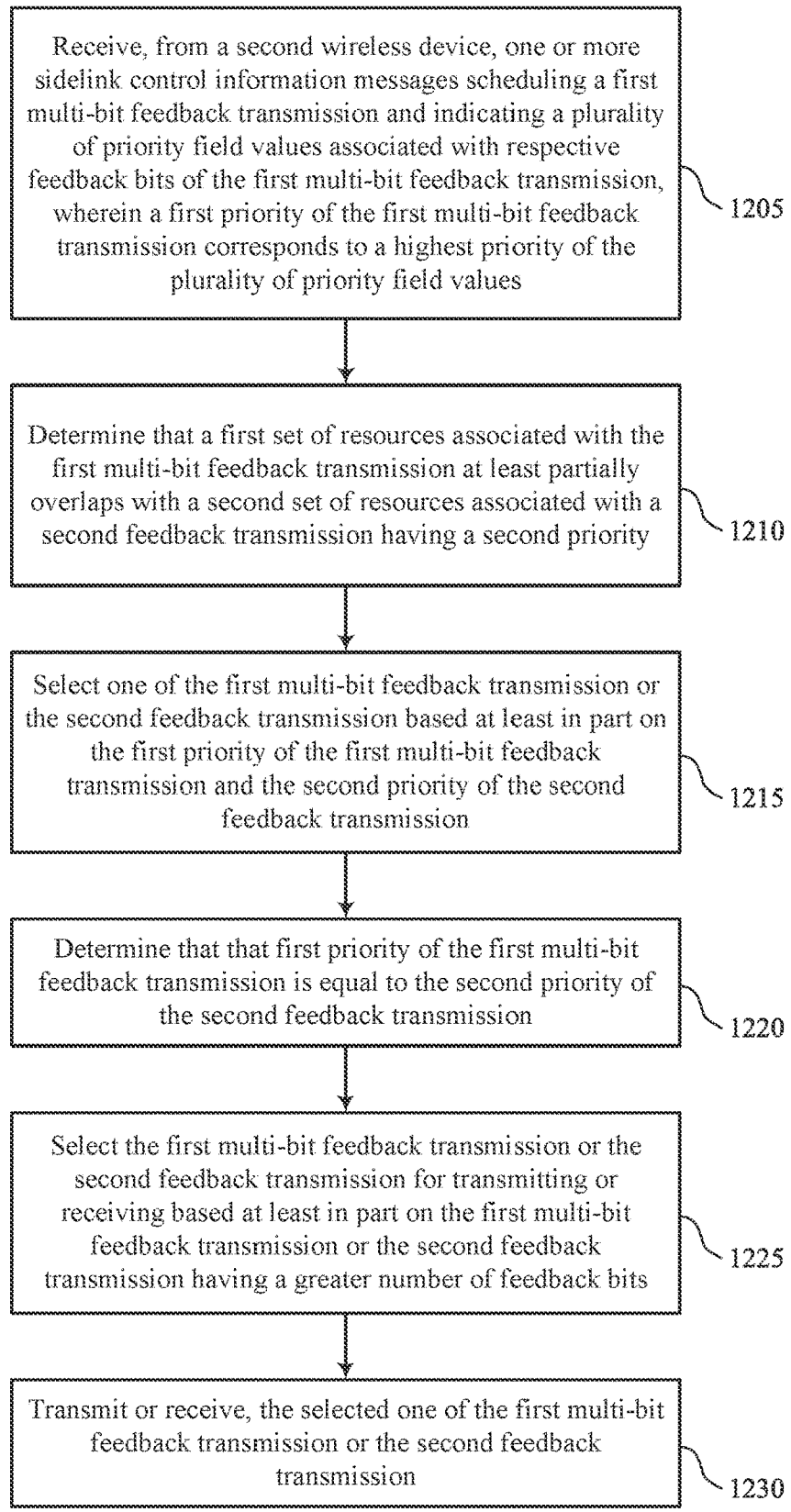

FIG. 12 shows a flowchart illustrating a method 1200 that supports prioritization between feedback transmissions and receptions over sidelink in accordance with aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1205, the method may include receiving, from a second wireless device, one or more sidelink control information messages scheduling a first multi-bit feedback and indicating a set of multiple priority field values associated with respective feedback bits of the first multi-bit feedback, where a first priority of the first multi-bit feedback corresponds to a highest priority of the set of multiple priority field values. The operations of 1205 may be performed in accordance with examples as disclosed herein. In some examples, aspects of the operations of 1205 may be performed by a multi-bit feedback scheduling component 825 as described with reference to FIG. 8.

At 1210, the method may include determining that a first set of resources allocated for the first multi-bit feedback at least partially overlaps with a second set of resources allocated for a second feedback having a second priority. The operations of 1210 may be performed in accordance with examples as disclosed herein. In some examples, aspects of the operations of 1210 may be performed by a feedback priority component 830 as described with reference to FIG. 8.

At 1215, the method may include selecting one of the first multi-bit feedback or the second feedback based on the first priority of the first multi-bit feedback and the second priority of the second feedback. The operations of 1215 may be performed in accordance with examples as disclosed herein. In some examples, aspects of the operations of 1215 may be performed by a feedback selection component 835 as described with reference to FIG. 8.

At 1220, the method may include determining that the first priority of the first multi-bit feedback is equal to the second priority of the second feedback. The operations of 1220 may be performed in accordance with examples as disclosed herein. In some examples, aspects of the operations of 1220 may be performed by a feedback priority component 830 as described with reference to FIG. 8.

At 1225, the method may include selecting the first multi-bit feedback or the second feedback for transmitting or receiving based on the first multi-bit feedback or the second feedback having a greater number of feedback bits. The operations of 1225 may be performed in accordance with examples as disclosed herein. In some examples, aspects of the operations of 1225 may be performed by a feedback selection component 835 as described with reference to FIG. 8.

At 1230, the method may include transmitting or receiving, the selected one of the first multi-bit feedback or the second feedback. The operations of 1230 may be performed in accordance with examples as disclosed herein. In some examples, aspects of the operations of 1230 may be performed by a feedback communication component 840 as described with reference to FIG. 8.

Figure 13:
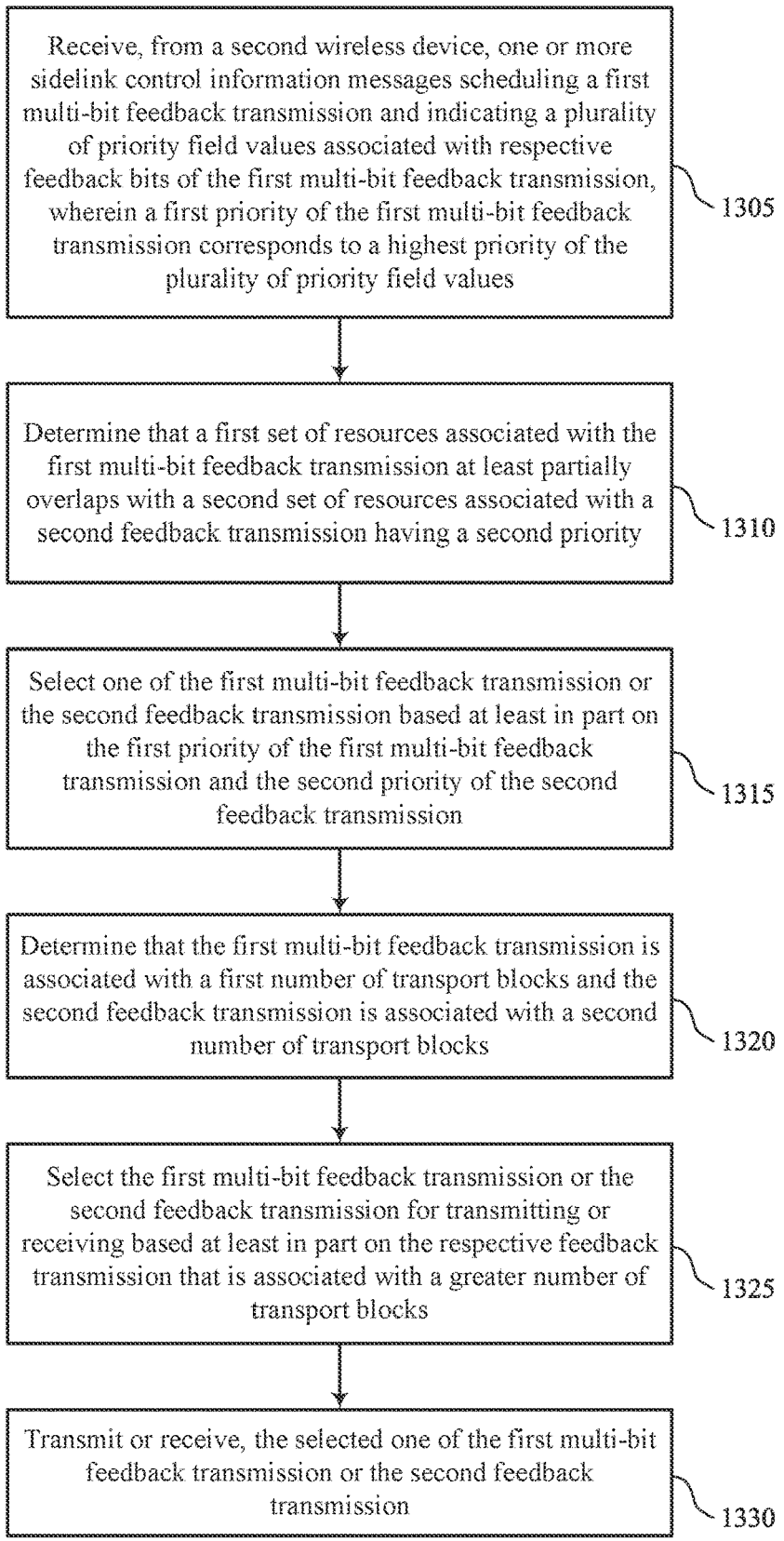

FIG. 13 shows a flowchart illustrating a method 1300 that supports prioritization between feedback transmissions and receptions over sidelink in accordance with aspects of the present disclosure. The operations of the method 1300 may be implemented by a UE or its components as described herein. For example, the operations of the method 1300 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1305, the method may include receiving, from a second wireless device, one or more sidelink control information messages scheduling a first multi-bit feedback and indicating a set of multiple priority field values associated with respective feedback bits of the first multi-bit feedback, where a first priority of the first multi-bit feedback corresponds to a highest priority of the set of multiple priority field values. The operations of 1305 may be performed in accordance with examples as disclosed herein. In some examples, aspects of the operations of 1305 may be performed by a multi-bit feedback scheduling component 825 as described with reference to FIG. 8.

At 1310, the method may include determining that a first set of resources allocated for the first multi-bit feedback at least partially overlaps with a second set of resources allocated for a second feedback having a second priority. The operations of 1310 may be performed in accordance with examples as disclosed herein. In some examples, aspects of the operations of 1310 may be performed by a feedback priority component 830 as described with reference to FIG. 8.

At 1315, the method may include selecting one of the first multi-bit feedback or the second feedback based on the first priority of the first multi-bit feedback and the second priority of the second feedback. The operations of 1315 may be performed in accordance with examples as disclosed herein. In some examples, aspects of the operations of 1315 may be performed by a feedback selection component 835 as described with reference to FIG. 8.

At 1320, the method may include determining that the first multi-bit feedback is associated with a first number of transport blocks and the second feedback is allocated for a second number of transport blocks. The operations of 1320 may be performed in accordance with examples as disclosed herein. In some examples, aspects of the operations of 1320 may be performed by a transport block allocation component 845 as described with reference to FIG. 8.

At 1325, the method may include selecting the first multi-bit feedback or the second feedback for transmitting or receiving based on the respective feedback transmission that is associated with a greater number of transport blocks. The operations of 1325 may be performed in accordance with examples as disclosed herein. In some examples, aspects of the operations of 1325 may be performed by a transport block allocation component 845 as described with reference to FIG. 8.

At 1330, the method may include transmitting or receiving, the selected one of the first multi-bit feedback or the second feedback. The operations of 1330 may be performed in accordance with examples as disclosed herein. In some examples, aspects of the operations of 1330 may be performed by a feedback communication component 840 as described with reference to FIG. 8.

Figure 14:
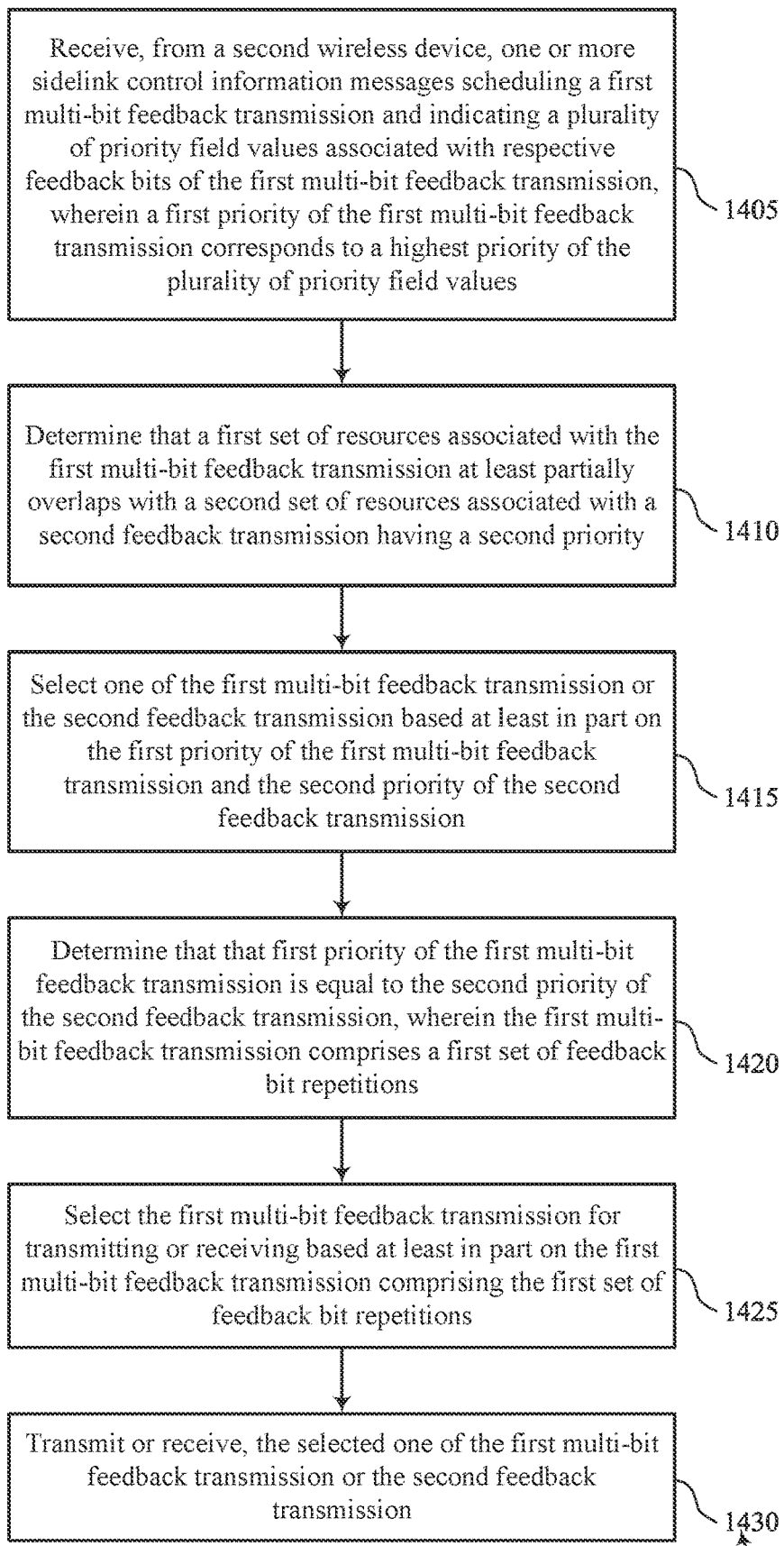

FIG. 14 shows a flowchart illustrating a method 1400 that supports prioritization between feedback transmissions and receptions over sidelink in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving, from a second wireless device, one or more sidelink control information messages scheduling a first multi-bit feedback and indicating a set of multiple priority field values associated with respective feedback bits of the first multi-bit feedback, where a first priority of the first multi-bit feedback corresponds to a highest priority of the set of multiple priority field values. The operations of 1405 may be performed in accordance with examples as disclosed herein. In some examples, aspects of the operations of 1405 may be performed by a multi-bit feedback scheduling component 825 as described with reference to FIG. 8.

At 1410, the method may include determining that a first set of resources allocated for the first multi-bit feedback at least partially overlaps with a second set of resources allocated for a second feedback having a second priority. The operations of 1410 may be performed in accordance with examples as disclosed herein. In some examples, aspects of the operations of 1410 may be performed by a feedback priority component 830 as described with reference to FIG. 8.

At 1415, the method may include selecting one of the first multi-bit feedback or the second feedback based on the first priority of the first multi-bit feedback and the second priority of the second feedback. The operations of 1415 may be performed in accordance with examples as disclosed herein. In some examples, aspects of the operations of 1415 may be performed by a feedback selection component 835 as described with reference to FIG. 8.

At 1420, the method may include determining that the first priority of the first multi-bit feedback is equal to the second priority of the second feedback, where the first multi-bit feedback includes a first set of feedback bit repetitions. The operations of 1420 may be performed in accordance with examples as disclosed herein. In some examples, aspects of the operations of 1420 may be performed by a repetition component 850 as described with reference to FIG. 8.

At 1425, the method may include selecting the first multi-bit feedback for transmitting or receiving based on the first multi-bit feedback including the first set of feedback bit repetitions. The operations of 1425 may be performed in accordance with examples as disclosed herein. In some examples, aspects of the operations of 1425 may be performed by a feedback selection component 835 as described with reference to FIG. 8.

At 1430, the method may include transmitting or receiving, the selected one of the first multi-bit feedback or the second feedback. The operations of 1430 may be performed in accordance with examples as disclosed herein. In some examples, aspects of the operations of 1430 may be performed by a feedback communication component 840 as described with reference to FIG. 8.

The following provides an overview of aspects of the present disclosure:

Aspect 1: A method for wireless communications at a first wireless device, comprising: receiving, from a second wireless device, one or more sidelink control information messages scheduling a first multi-bit feedback and indicating a plurality of priority field values associated with respective feedback bits of the first multi-bit feedback, wherein a first priority of the first multi-bit feedback corresponds to a highest priority of the plurality of priority field values; determining that a first set of resources allocated for the first multi-bit feedback at least partially overlaps with a second set of resources allocated for a second feedback having a second priority; selecting one of the first multi-bit feedback or the second feedback based at least in part on the first priority of the first multi-bit feedback and the second priority of the second feedback; and transmitting or receiving, the selected one of the first multi-bit feedback or the second feedback.

Aspect 2: The method of aspect 1, wherein selecting one of the first multi-bit feedback or the second feedback comprises: selecting the first multi-bit feedback for transmission or reception over the first set of resources based at least in part on the first priority being higher than the second priority.

Aspect 3: The method of aspect 2, wherein a first priority field value corresponding to the first priority is smaller than a second priority field value corresponding to the second priority.

Aspect 4: The method of any of aspects 1 through 3, wherein selecting one of the first multi-bit feedback or the second feedback comprises: receiving, from the second wireless device, a priority field value associated with the second feedback, wherein the priority field value associated with the second feedback corresponds to the second priority of the second feedback.

Aspect 5: The method of any of aspects 1 through 4, wherein selecting one of the first multi-bit feedback or the second feedback comprises: determining that the first priority of the first multi-bit feedback is equal to the second priority of the second feedback; comparing a number of feedback bits of the first multi-bit feedback to a number of feedback bits of the second feedback to determine which feedback has a greater number of feedback bits; and selecting the first multi-bit feedback or the second feedback for transmitting or receiving based at least in part on the comparing.

Aspect 6: The method of any of aspects 1 through 5, wherein selecting one of the first multi-bit feedback or the second feedback comprises: determining that the first multi-bit feedback is associated with a first number of transport blocks and the second feedback is associated with a second number of transport blocks; and selecting the first multi-bit feedback or the second feedback for transmitting or receiving based at least in part on the respective feedback transmission that is associated with a greater number of transport blocks.

Aspect 7: The method of any of aspects 1 through 6, wherein selecting one of the first multi-bit feedback or the second feedback comprises: determining that the first priority of the first multi-bit feedback is equal to the second priority of the second feedback, wherein the first multi-bit feedback comprises a first set of feedback bit repetitions; and selecting the first multi-bit feedback for transmitting or receiving based at least in part on the first multi-bit feedback comprising the first set of feedback bit repetitions.

Aspect 8: The method of aspect 7, wherein the second feedback comprises a single-shot feedback transmission.

Aspect 9: The method of any of aspects 7 through 8, wherein selecting one of the first multi-bit feedback or the second feedback comprises: determining the second feedback comprises a second set of feedback bit repetitions; and selecting the first multi-bit feedback for transmitting or receiving based at least in part on the first multi-bit feedback occurring before the second feedback.

Aspect 10: The method of aspect 9, wherein selecting one of the first multi-bit feedback or the second feedback comprises: determining that the first multi-bit feedback occurs concurrently with the second feedback; and selecting the first multi-bit feedback for transmitting or receiving based at least in part on the first multi-bit feedback comprising a greater number of feedback bits.

Aspect 11: The method of any of aspects 7 through 10, wherein selecting one of the first multi-bit feedback or the second feedback comprises: determining the second feedback comprises a second set of feedback bit repetitions; and selecting the first multi-bit feedback for transmitting or receiving based at least in part on the first set of feedback bit repetitions having a greater number of repetitions than the second set of feedback bit repetitions, wherein the first multi-bit feedback and the second feedback have an equal number of feedback bits.

Aspect 12: The method of any of aspects 7 through 11, further comprising: determining the second feedback comprises a second set of feedback bit repetitions, wherein at least a portion of the first set of feedback bit repetitions are non-overlapping with the second set of feedback bit repetitions; and transmitting or receiving at least the portion of the first set of feedback bit repetitions and the second set of feedback bit repetitions that are non-overlapping.

Aspect 13: The method of any of aspects 1 through 12, wherein the respective feedback bits of the first multi-bit feedback comprise a plurality of HARQ bits responsive to at least one sidelink shared channel transmission.

Aspect 14: The method of any of aspects 1 through 13, wherein the second priority of the second feedback corresponds to an additional highest priority of one or more priority field values associated with respective feedback bits of the second feedback.

Aspect 15: An apparatus for wireless communications at a first wireless device, comprising a processor; memory coupled with the processor; and instructions stored in the memory and executable by the processor to cause the apparatus to perform a method of any of aspects 1 through 14.

Aspect 16: An apparatus for wireless communications at a first wireless device, comprising at least one means for performing a method of any of aspects 1 through 14.

Aspect 17: A non-transitory computer-readable medium storing code for wireless communications at a first wireless device, the code comprising instructions executable by a processor to perform a method of any of aspects 1 through 14.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first wireless device, comprising:
one or more memories storing processor-executable code; and
one or more processors coupled with the one or more memories and operable to execute the code to cause the first wireless device to:
receive, from a second wireless device, one or more sidelink control information messages scheduling a first multi-bit feedback and indicating a plurality of priority field values associated with respective feedback bits of the first multi-bit feedback, wherein each respective feedback bit of the first multi-bit feedback is associated with a corresponding priority field value, and wherein a first priority of the first multi-bit feedback is based at least in part on a feedback bit that has a smallest priority field value corresponding to a highest overall priority level of the respective feedback bits of the first multi-bit feedback;
determine that a first set of resources allocated for the first multi-bit feedback at least partially overlaps with a second set of resources allocated for a second feedback having a second priority;
select one of the first multi-bit feedback or the second feedback based at least in part on the first priority of the first multi-bit feedback and the second priority of the second feedback; and
transmit or receive, the selected one of the first multi-bit feedback or the second feedback.

2. The first wireless device of claim 1, wherein, to select one of the first multi-bit feedback or the second feedback, the one or more processors are operable to execute the code to cause the first wireless device to:
select the first multi-bit feedback for transmission or reception over the first set of resources based at least in part on the first priority being higher than the second priority.

3. The first wireless device of claim 2, wherein a first priority field value corresponding to the first priority is smaller than a second priority field value corresponding to the second priority.

4. The first wireless device of claim 1, wherein, to select one of the first multi-bit feedback or the second feedback, the one or more processors are operable to execute the code to cause the first wireless device to:
receive, from the second wireless device, a priority field value associated with the second feedback, wherein the priority field value associated with the second feedback corresponds to the second priority of the second feedback.

5. The first wireless device of claim 1, wherein, to select one of the first multi-bit feedback or the second feedback, the one or more processors are operable to execute the code to cause the first wireless device to:
determine that the first priority of the first multi-bit feedback is equal to the second priority of the second feedback;
compare a number of feedback bits of the first multi-bit feedback to a number of feedback bits of the second feedback to determine which feedback has a greatest number of feedback bits; and
select the first multi-bit feedback or the second feedback for transmitting or receiving based at least in part on the comparing.

6. The first wireless device of claim 1, wherein, to select one of the first multi-bit feedback or the second feedback, the one or more processors are operable to execute the code to cause the first wireless device to:
determine that the first multi-bit feedback is associated with a first number of transport blocks and the second feedback is associated with a second number of transport blocks; and
select the first multi-bit feedback or the second feedback for transmitting or receiving based at least in part on a respective feedback transmission that is associated with a greater number of transport blocks.

7. The first wireless device of claim 1, wherein, to select one of the first multi-bit feedback or the second feedback, the one or more processors are operable to execute the code to cause the first wireless device to:
determine that the first priority of the first multi-bit feedback is equal to the second priority of the second feedback, wherein the first multi-bit feedback comprises a first set of feedback bit repetitions; and select the first multi-bit feedback for transmitting or receiving based at least in part on the first multi-bit feedback comprising the first set of feedback bit repetitions.

8. The first wireless device of claim 7, wherein the second feedback comprises a single-shot feedback transmission.

9. The first wireless device of claim 7, wherein, to select one of the first multi-bit feedback or the second feedback, the one or more processors are operable to execute the code to cause the first wireless device to:
determine the second feedback comprises a second set of feedback bit repetitions; and
select the first multi-bit feedback for transmitting or receiving based at least in part on the first multi-bit feedback occurring before the second feedback.

10. The first wireless device of claim 9, wherein, to select one of the first multi-bit feedback or the second feedback, the one or more processors are operable to execute the code to cause the first wireless device to:
determine that the first multi-bit feedback occurs concurrently with the second feedback; and
select the first multi-bit feedback for transmitting or receiving based at least in part on the first multi-bit feedback comprising a greater number of feedback bits.

11. The first wireless device of claim 7, wherein, to select one of the first multi-bit feedback or the second feedback, the one or more processors are operable to execute the code to cause the first wireless device to:
determine the second feedback comprises a second set of feedback bit repetitions; and
select the first multi-bit feedback for transmitting or receiving based at least in part on the first set of feedback bit repetitions having a greater number of repetitions than the second set of feedback bit repetitions, wherein the first multi-bit feedback and the second feedback have an equal number of feedback bits.

12. The first wireless device of claim 7, wherein the one or more processors are operable to execute the code to cause the first wireless device to:
determine the second feedback comprises a second set of feedback bit repetitions, wherein at least a portion of the first set of feedback bit repetitions are non-overlapping with the second set of feedback bit repetitions; and
transmit or receive at least the portion of the first set of feedback bit repetitions and the second set of feedback bit repetitions that are non-overlapping.

13. The first wireless device of claim 1, wherein the respective feedback bits of the first multi-bit feedback comprise a plurality of hybrid automatic repeat request (HARQ) bits responsive to at least one sidelink shared channel transmission.

14. The first wireless device of claim 1, wherein the second priority of the second feedback corresponds to an additional highest priority of one or more priority field values associated with respective feedback bits of the second feedback.

15. A method for wireless communications by a first wireless device, comprising:
receiving, from a second wireless device, one or more sidelink control information messages scheduling a first multi-bit feedback and indicating a plurality of priority field values associated with respective feedback bits of the first multi-bit feedback, wherein each respective feedback bit of the first multi-bit feedback is associated with a corresponding priority field value, and wherein a first priority of the first multi-bit feedback is based at least in part on a feedback bit that has a smallest priority field value corresponding to a highest overall priority level of the respective feedback bits of the first multi-bit feedback;
determining that a first set of resources allocated for the first multi-bit feedback at least partially overlaps with a second set of resources allocated for a second feedback having a second priority;
selecting one of the first multi-bit feedback or the second feedback based at least in part on the first priority of the first multi-bit feedback and the second priority of the second feedback; and
transmitting or receiving, the selected one of the first multi-bit feedback or the second feedback.

16. The method of claim 15, wherein selecting one of the first multi-bit feedback or the second feedback further comprises:
selecting the first multi-bit feedback for transmission or reception over the first set of resources based at least in part on the first priority being higher than the second priority.

17. The method of claim 16, wherein a first priority field value corresponding to the first priority is smaller than a second priority field value corresponding to the second priority.

18. The method of claim 15, wherein selecting one of the first multi-bit feedback or the second feedback further comprises:
receiving, from the second wireless device, a priority field value associated with the second feedback, wherein the priority field value associated with the second feedback corresponds to the second priority of the second feedback.

19. The method of claim 15, wherein selecting one of the first multi-bit feedback or the second feedback further comprises:
determining that the first priority of the first multi-bit feedback is equal to the second priority of the second feedback;
comparing a number of feedback bits of the first multi-bit feedback to a number of feedback bits of the second feedback to determine which feedback has a greater number of feedback bits; and
selecting the first multi-bit feedback or the second feedback for transmitting or receiving based at least in part on the comparing.

20. The method of claim 15, wherein selecting one of the first multi-bit feedback or the second feedback further comprises:
determining that the first multi-bit feedback is associated with a first number of transport blocks and the second feedback is associated with a second number of transport blocks; and
selecting the first multi-bit feedback or the second feedback for transmitting or receiving based at least in part on a respective feedback transmission that is associated with a greater number of transport blocks.

21. The method of claim 15, wherein selecting one of the first multi-bit feedback or the second feedback further comprises:
determining that the first priority of the first multi-bit feedback is equal to the second priority of the second feedback, wherein the first multi-bit feedback comprises a first set of feedback bit repetitions; and selecting the first multi-bit feedback for transmitting or receiving based at least in part on the first multi-bit feedback comprising the first set of feedback bit repetitions.

22. The method of claim 21, wherein the second feedback comprises a single-shot feedback transmission.

23. The method of claim 21, wherein selecting one of the first multi-bit feedback or the second feedback further comprises:
determining the second feedback comprises a second set of feedback bit repetitions; and
selecting the first multi-bit feedback for transmitting or receiving based at least in part on the first multi-bit feedback occurring before the second feedback.

24. The method of claim 23, wherein selecting one of the first multi-bit feedback or the second feedback further comprises:
determining that the first multi-bit feedback occurs concurrently with the second feedback; and
selecting the first multi-bit feedback for transmitting or receiving based at least in part on the first multi-bit feedback comprising a greater number of feedback bits.

25. The method of claim 21, wherein selecting one of the first multi-bit feedback or the second feedback further comprises:
determining the second feedback comprises a second set of feedback bit repetitions; and
selecting the first multi-bit feedback for transmitting or receiving based at least in part on the first set of feedback bit repetitions having a greater number of repetitions than the second set of feedback bit repetitions, wherein the first multi-bit feedback and the second feedback have an equal number of feedback bits.

26. The method of claim 21, further comprising:
determining the second feedback comprises a second set of feedback bit repetitions, wherein at least a portion of the first set of feedback bit repetitions are non-overlapping with the second set of feedback bit repetitions; and
transmitting or receiving at least the portion of the first set of feedback bit repetitions and the second set of feedback bit repetitions that are non-overlapping.

27. The method of claim 15, wherein the respective feedback bits of the first multi-bit feedback comprise a plurality of hybrid automatic repeat request (HARQ) bits responsive to at least one sidelink shared channel transmission.

28. The method of claim 15, wherein the second priority of the second feedback corresponds to an additional highest priority of one or more priority field values associated with respective feedback bits of the second feedback.

29. A first wireless device for wireless communication, comprising:
means for receiving, from a second wireless device, one or more sidelink control information messages scheduling a first multi-bit feedback and indicating a plurality of priority field values associated with respective feedback bits of the first multi-bit feedback, wherein each respective feedback bit of the first multi-bit feedback is associated with a corresponding priority field value, and wherein a first priority of the first multi-bit feedback is based at least in part on a feedback bit that has a smallest priority field value corresponding to a highest overall priority level of the respective feedback bits of the first multi-bit feedback;
means for determining that a first set of resources allocated for the first multi-bit feedback at least partially overlaps with a second set of resources allocated for a second feedback having a second priority;
means for selecting one of the first multi-bit feedback or the second feedback based at least in part on the first priority of the first multi-bit feedback and the second priority of the second feedback; and
means for transmitting or receiving, the selected one of the first multi-bit feedback or the second feedback.

30. A non-transitory computer-readable medium storing code for wireless communication at a first wireless device, the code comprising instructions executable by one or more processors to:
receive, from a second wireless device, one or more sidelink control information messages scheduling a first multi-bit feedback and indicating a plurality of priority field values associated with respective feedback bits of the first multi-bit feedback, wherein each respective feedback bit of the first multi-bit feedback is associated with a corresponding priority field value, and wherein a first priority of the first multi-bit feedback is based at least in part on a feedback bit that has a smallest priority field value corresponding to a highest overall priority level of the respective feedback bits of the first multi-bit feedback;
determine that a first set of resources allocated for the first multi-bit feedback at least partially overlaps with a second set of resources allocated for a second feedback having a second priority;
select one of the first multi-bit feedback or the second feedback based at least in part on the first priority of the first multi-bit feedback and the second priority of the second feedback; and
transmit or receive, the selected one of the first multi-bit feedback or the second feedback.

* * * * *